(12) United States Patent
Matsuoka

(10) Patent No.: US 6,898,426 B2
(45) Date of Patent: May 24, 2005

(54) MOBILE PHONE TERMINAL, AND PERIPHERAL UNIT FOR ACOUSTIC TEST OF MOBILE PHONE TERMINAL

(75) Inventor: Bunkei Matsuoka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 475 days.

(21) Appl. No.: 10/050,588

(22) Filed: Jan. 18, 2002

(65) Prior Publication Data

US 2002/0137506 A1 Sep. 26, 2002

(30) Foreign Application Priority Data

Feb. 2, 2001 (JP) ........................................ 2001-027423

(51) Int. Cl.[7] .............................................. H04Q 7/20
(52) U.S. Cl. ..................... 455/425; 455/423; 455/67.11; 455/115.1; 455/226.1
(58) Field of Search ................................ 455/423, 425, 455/115.1, 115.2, 115.4, 226.1, 226.4

(56) References Cited

U.S. PATENT DOCUMENTS

| 5,737,693 A | * | 4/1998 | Aldridge et al. ......... 455/67.14 |
| 5,821,742 A | | 10/1998 | Carr et al. |
| 6,148,354 A | | 11/2000 | Ban et al. |
| 6,625,448 B1 | * | 9/2003 | Stern ........................ 455/425 |

FOREIGN PATENT DOCUMENTS

| EP | 0 535 838 | 4/1993 |
| EP | 0 550 151 | 7/1993 |
| EP | 0 734 192 | 9/1996 |
| JP | 5-153025 | 6/1993 |
| JP | 9-83632 | 3/1997 |
| JP | 2001-36625 | 2/2001 |

OTHER PUBLICATIONS

"Digital Cellular Telecommunications System (Phase 2+); Individual Equipment Type Requirements and Interworking; Special Conformance Testing Functions" ETSI TS 101 293 v8.1.0 (Aug. 2000) 1999 pp. 1–41.

* cited by examiner

Primary Examiner—Duc Nguyen
(74) Attorney, Agent, or Firm—Oblon, Spivak, McClelland, Maier & Neustadt, P.C.

(57) ABSTRACT

A mobile phone terminal includes a transmitting side speech signal path switch and receiving side speech signal path switch, and a general purpose USB port. The signal path switches are interposed between a speech coder/decoder and an A/D converter and D/A converter to enable a terminal acoustic evaluation signal to be input and output through a path different from that in a normal operation mode of the mobile phone terminal. The general purpose USB port is used for connecting the signal path switches with an external terminal unit so that the control signals of the signal path switches and a terminal acoustic test signal are transferred across these signal path switches and the general purpose USB port. The mobile phone terminal can mount the external connection port for the acoustic evaluation test more efficiently.

10 Claims, 14 Drawing Sheets

MOBILE PHONE TERMINAL, AND PERIPHERAL UNIT FOR ACOUSTIC TEST OF MOBILE PHONE TERMINAL

BACKGROUND OF THE INVENTION

1. Field of the Invention

The present invention relates to a configuration of a mobile phone terminal, and to a peripheral unit for acoustic test of the mobile phone terminal, which connects the mobile phone terminal with a terminal acoustic evaluation unit for conducting an evaluation test of the acoustic characteristics of the mobile phone terminal.

2. Description of Related Art

To maintain speech quality of a mobile phone terminal, characteristic evaluations of various digital speech signal processors are carried out. These evaluations include frequency characteristic evaluations of its microphone and receiver (speaker), characteristic evaluations of an analog acoustic system such as an amount of acoustic echo occurring between the receiver and microphone, coding and decoding characteristic evaluations of a speech coder/decoder used by the mobile phone terminal, and echo elimination performance evaluations of an acoustic echo canceler. A peripheral unit for acoustic test is used for connecting the mobile phone terminal with a terminal acoustic evaluation unit for carrying out these characteristic evaluations.

As a conventional technique, there is a method of connecting a GSM (Global System for Mobile Communication) mobile phone terminal with a system simulator as described in GSM 04.14 of ETSI (European Telecommunication Standards Institutes) standards. The system simulator has the following functions as a party station of the mobile phone terminal to be evaluated. First, it can establish between it and the mobile phone terminal a TDMA radio connection identical to that used in an actual channel, and transmits and receives a speech code sequence using the channel. Besides, it transmits and receives a separate terminal control signal and a PCM digital speech signal using a dedicated port called DAI (Digital Audio Interface: abbreviated to DAI ports from now on). The mobile phone terminal and system simulator each comprise a DAI port composed of a dedicated 25-pin DSUB socket in accordance with ISO 2110 standard, and the two DAI ports are connected by a cable with connectors matching the shape of the ports.

The GSM 04.14 of the ETSI standards also specifies individual conditions such as electrical signal conditions, signal timings, and logical interfaces. Its signal transmission rate is specified at 104 kbits/second in both directions from the mobile phone terminal to the system simulator and from the system simulator to the mobile phone terminal. It is based on the calculation of 8000 (samples/second)×13 (bits/sample)=104,000 (bits/second) assigned to an evaluation speech signal. Using the specified shape of connectors and the unique transmission rate, the DAI ports are not connectable directly to a cable with connectors corresponding to various types of general purpose ports (such as USB, IEEE1394, RS-232C and RS423) which are widely used as external connecting ports of various types of current computer systems.

As for the GSM mobile phone terminal, three types of acoustic evaluation tests can be achieved by interconnecting the mobile phone terminal with the system simulator using the DAI ports, and by establishing a radio connection at the same time. The three types of acoustic evaluation tests will now be described with reference to FIGS. 10–14.

FIG. 10 is a block diagram showing a device connection state at a terminal acoustic evaluation test in a conventional GSM mobile phone terminal. In FIG. 10, the reference numeral 1 designates a mobile phone terminal, 2 designates a system simulator, and 3 designates an external terminal unit. In the mobile phone terminal 1, the reference numeral 10 designates a microphone, 11 designates a receiver, 12 designates a microphone amplifier, 13 designates a receiver amplifier, 14 designates an A/D converter, 15 designates a D/A converter, 16 designates a speech coder/decoder, 17 designates a terminal adapter, 18 designates a data communication port, 19 designates a radio interface, 20 designates an antenna, 21 designates a transmitting side speech signal path switch, 22 designates a receiving side speech signal path switch, and 23 designates a DAI port. In the system simulator 2, the reference numeral 40 designates a DAI port, 41 designates an evaluation signal storage, 42 designates a radio interface, 43 designates an antenna, and 44 designates a control and signal evaluation section.

Next, the operation will be described.

First, operations of the individual components as shown in FIG. 10 will be described. As for the components in the mobile phone terminal 1, the microphone 10 gathers input voice, and converts it into an analog electric signal. The microphone amplifier 12 amplifies the analog electric signal. The A/D converter 14 converts the amplified analog electric signal into a 13-bit linear PCM digital speech signal at 8000 samples per second. On the other hand, the D/A converter 15 converts the 13-bit linear PCM digital speech signal at 8000 samples per second fed from the receiving side speech signal path switch 22 into an analog electric signal. The receiver amplifier 13 amplifies the analog electric signal. The receiver 11 converts the amplified analog electric signal into voice, and radiates it to external space.

The speech coder/decoder 16 codes the 13-bit linear PCM digital speech signal at 8000 samples per second fed from the transmitting side speech signal path switch 21 to a code sequence, and decodes a code sequence fed from the radio interface 19 into the 13-bit linear PCM digital speech signal at 8000 samples per second. The radio interface 19 modulates the code sequence and transmits it via the antenna 20, and demodulates the signal received by the antenna 20.

The DAI port 23 exchanges a signal with the system simulator 2 in response to the switching state of the transmitting side speech signal path switch 21 or of the receiving side speech signal path switch 22. The signal transmission rate of the DAI port 23 is 104 kbits/second in both directions. It is based on the calculation of the evaluation speech signal: 8000 (samples/second)×13 (bits)=104,000 (bits/second).

On the other hand, the terminal adapter 17 exchanges with the radio interface 19 the digital transmission and reception data transferred to and from the external terminal unit 3 via the data communication port 18. Typically, a personal computer (called PC from now on) is connected to the data communication port 18 as the external terminal unit 3 via a modem so that it can transmit or receive e-mail via a mobile telephone line, or gain access to a network. As a result, it is necessary for the data communication port 18 to transfer a signal different from the 13-bit linear PCM digital speech signal at 8000 samples per second which is exchanged via the DAI port 23. Accordingly, the data communication port 18 must be installed separately from the DAI port 23, making it impossible to use a common port for them.

As for the individual operations of the transmitting side speech signal path switch 21 and receiving side speech signal path switch 22 as the components of the mobile phone terminal 1, they will be described later along with the concrete operation of the mobile phone terminal 1 with reference to FIGS. 11–14.

The control and signal evaluation section 44 of the system simulator 2 transmits the evaluation signal or evaluation code sequence stored in the evaluation signal storage 41 to the DAI port 40 or radio interface 42, transfers the evaluation signal or evaluation code sequence supplied from the DAI port 40 or radio interface 42 to the evaluation signal storage 41, and sends to the DAI port 40 a setting control signal on the mobile phone terminal 1 side, which is necessary for each test condition. The radio interface 42 and antenna 43 establish a radio connection with the antenna 20 and radio interface 19 of the mobile phone terminal 1 to exchange the setting control signal and evaluation code sequence with the mobile phone terminal 1 side.

Next, the operation of the transmitting side speech signal path switch 21 and receiving side speech signal path switch 22 will be described. Here, the transmitting side speech signal path switch 21 is composed of two switching devices 21-1 and 21-2, and the receiving side speech signal path switch 22 is composed of two switching devices 22-1 and 22-2. As for the operation of the mobile phone terminal 1 which is connected with the system simulator 2 via the radio connection and DAI, the ETSI standards specifies four test functions: normal operation; evaluation of a speech decoder; evaluation of a speech coder; and evaluation of a microphone, receiver, A/D converter, and D/A converter. One of the four functions is set by the individual switching devices 21-1, 21-2, 22-1 and 22-2 of the transmitting side speech signal path switch 21 and receiving side speech signal path switch 22. Here, the control information required for the setting is sent from the system simulator 2 to the transmitting side speech signal path switch 21 and receiving side speech signal path switch 22 via the DAI ports 40 and 23.

In the normal operation, the switching devices 21-1, 21-2, 22-1 and 22-2 of the transmitting side speech signal path switch 21 and receiving side speech signal path switch 22 are each connected to the a-position as shown in FIG. 11. Thus, the A/D converter 14 and the D/A converter 15 are connected to the speech coder/decoder 16 so that no digital speech signal is exchanged between the mobile phone terminal 1 and the system simulator 2 via the DAI ports 23 and 40.

In the evaluation of the speech decoder, the switching device 22-1 of the receiving side speech signal path switch 22 is connected to the b-position with the remaining switching devices 21-1, 21-2 and 22-2 being connected to the a-position as shown in FIG. 12. Thus, the speech code sequence sent from the system simulator 2 to the mobile phone terminal 1 via the radio connection is decoded by the speech decoder in the speech coder/decoder 16, and is sent back to the system simulator 2 via the b-position of the switching device 22-1 of the receiving side speech signal path switch 22. The system simulator 2 compares it with a digital speech signal which is prepared in advance in the control and signal evaluation section 44. If they disagree, the system simulator 2 makes a decision that the speech coder/decoder 16 of the mobile phone terminal 1 has a problem in its decoding process.

On the other hand, in the evaluation of the speech coder, the switching device 21-1 of the transmitting side speech signal path switch 21 is connected to the b-position with the remaining switching devices 21-2, 22-1 and 22-2 being connected to the a-position as shown in FIG. 13. Thus, a signal supplied from the system simulator 2 to the mobile phone terminal 1 is sent to the speech coder/decoder 16 via the b-position of the switching device 21-1 of the transmitting side speech signal path switch 21. The signal is coded by the speech coder, and then sent back to the system simulator 2 via the radio connection. The system simulator 2 compares it with a speech encoding result which is prepared in advance in the control and signal evaluation section 44. If they disagree, it makes a decision that the speech coder/decoder 16 has a problem in its coding process.

In the evaluation of the microphone, receiver, A/D converter and D/A converter, the switching device 21-1 of the transmitting side speech signal path switch 21 is connected to the a-position, the switching device 21-2 is connected to the b-position, the switching device 22-1 of the receiving side speech signal path switch 22 is connected to the a-position and the switching device 22-2 is connected to the b-position as shown in FIG. 14. In FIG. 14, the reference numeral 50 designates an evaluation signal generator, 51 designates an artificial mouth amplifier, 52 designates an artificial mouth, 53 designates an artificial ear, 54 designates an artificial ear amplifier, and 55 designates a signal evaluation unit, which are used in the evaluation of the microphone, receiver, A/D converter and D/A converter.

First, the operation of the evaluation of the microphone 10 and A/D converter 14 will be described. The artificial mouth amplifier 51 amplifies the evaluation signal fed from the evaluation signal generator 50, and the artificial mouth 52 radiates it as evaluation speech. The evaluation speech is gathered by the microphone 10, amplified by the microphone amplifier 12, and converted into a digital speech signal by the A/D converter 14. The digital speech signal is sent to the system simulator 2 via the b-position of the switching device 21-2 of the transmitting side speech signal path switch 21, so that the control and signal evaluation section 44 evaluates the frequency characteristic of the microphone 10 and A/D converter 14.

Next, the operation of the evaluation of the receiver 11 and D/A converter 15 will be described. The 13-bit linear PCM digital speech signal at 8000 samples per second of −26 dBov, which is prepared in advance, is sent from the system simulator 2 to the mobile phone terminal 1. It passes through the b-position of the switching device 22-2 of the receiving side speech signal path switch 22, and is supplied to the D/A converter 15 that converts it into an analog electric signal. The analog electric signal is amplified by the receiver amplifier 13, and is converted into sound by the receiver 11 to be radiated to the space. The sound is gathered by the artificial ear 53, amplified by the artificial ear amplifier 54, and is subjected to the frequency characteristic analysis by the signal evaluation unit 55.

The acoustic echo evaluation of the mobile phone terminal 1 is carried out as follows. First, the system simulator 2 sends the digital speech signal in the same manner as in the evaluation of the receiver and D/A converter. The sound the receiver 11 radiates is gathered by the microphone 10, and the signal is sent back to the system simulator 2 in the same manner as in the evaluation of the microphone and A/D converter. The control and signal evaluation section 44 compares the signal level difference between the two signals, and compares it with a specified value, thereby completing the acoustic echo evaluation of the mobile phone terminal 1.

Incidentally, as for documents relevant to the conventional mobile phone terminal, there are Japanese patent application laid-open No. 2000-139032, and Japanese patent application laid-open No. 9-83632. The former discloses an apparatus of carrying out communication with an external device such as a PC via a battery charger using a USB interface mounted on the apparatus. The latter discloses a handsfree adapter using the DAI in a GSM terminal.

With the foregoing configuration, the conventional GSM mobile phone terminal carries out the acoustic evaluation tests as described above. Therefore, it must possess the physical interface (DAI port 23) specified for the DAI. Today, these mobile phone terminals often include a general purpose external connection interface (data communication port 18) that enables the data communication with a PC. However, although they include such a general purpose data communication port 18 in their body, they must also include the DAI port 23 separately for the acoustic evaluations. Thus, the conventional mobile phone terminal has a problem of reducing its size and weight.

In addition, the conventional GSM mobile phone terminal and its acoustic evaluation test have the following problems because the DAI port 23 is located between the speech coder/decoder 16 and the A/D converter 14 and D/A converter 15, because the signal exchanged between the mobile phone terminal 1 and the system simulator 2 via the DAI ports 23 and 40 is limited to the 13-bit linear PCM digital speech signal at 8000 samples per second only, and because it is essential to establish the connection with system simulator 2 via the radio connection in the test of the speech coder/decoder 16 to exchange the code sequence.

(1) Since the mobile phone terminal 1 and the system simulator 2 must comprise the radio interfaces 19 and 42 and antennas 20 and 43 for establishing the radio connection, it is unavoidable that the size of the evaluation system becomes large.

(2) When a combination with the radio interface 19 cannot be established in a special condition in the development stage of the terminal, the individual operation test of the speech coder/decoder 16, or of the A/D converter 14, D/A converter 15 and analog circuit section cannot be achieved independently.

(3) The error rate can increase depending on the operation condition of the radio connection, thereby causing instability of the operation of the evaluation system.

Likewise the conventional GSM mobile phone terminal and its acoustic evaluation test have another problem of being unable to conduct the characteristic evaluation of the radio interface alone because the DAI port 23 is located between the speech coder/decoder 16 and the A/D converter 14 and D/A converter 15, and because the signal exchanged between the mobile phone terminal 1 and the system simulator 2 via the DAI ports 23 and 40 is limited to the 13-bit linear PCM digital speech signal at 8000 samples per second only.

SUMMARY OF THE INVENTION

The present invention is implemented to solve the foregoing problems. It is therefore an object of the present invention to provide a mobile phone terminal and its peripheral circuit for the acoustic test that can mount the external connection port used for the acoustic evaluation test of the mobile phone terminal more efficiently. Another object of the present invention is to provide a mobile phone terminal and its peripheral circuit for the acoustic test that can handle evaluation items such as the evaluation of the speech coder/decoder alone or the radio interface alone, which cannot be implemented by the conventional method, more easily and more positively.

According to a first aspect of the present invention, there is provided a mobile phone terminal that converts transmission speech into a digital speech signal by an A/D converter, encodes the digital speech signal by a speech coder/decoder, and transmits the code sequence via a radio interface and an antenna, and that supplies a received signal received by the antenna to the speech coder/decoder via the radio interface, and converts a digital speech signal output from the speech coder/decoder into an analog electric signal by a D/A converter, the mobile phone terminal comprising: a general purpose connection port usable for connecting an external device to the mobile phone terminal; and a first signal path switch interposed between the speech coder/decoder and the A/D converter and D/A converter to enable a terminal acoustic evaluation signal to be input and output through a path different from that in a normal operation mode of the mobile phone terminal, wherein the terminal acoustic evaluation signal and a control signal of the first signal path switch are input and output through the first signal path switch and the general purpose connection port.

Here, the mobile phone terminal may further comprise a second signal path switch interposed between the radio interface and the speech coder/decoder to enable an evaluation code sequence of the speech coder/decoder to be input and output through a path different from that in the normal operation mode of the mobile phone terminal, wherein a test signal of the speech coder/decoder and a control signal of the second signal path switch may be input and output through the second signal path switch and the general purpose connection port.

The mobile phone terminal may further comprise a second signal path switch interposed between the radio interface and the speech coder/decoder to enable an evaluation code sequence of the radio interface to be input and output through a path different from that in the normal operation mode of the mobile phone terminal, wherein a test signal of the radio interface and a control signal of the second signal path switch may be input and output through the second signal path switch and the general purpose connection port.

The mobile phone terminal may further comprise a peripheral unit for acoustic test for connecting a mobile phone terminal with a terminal acoustic evaluation unit for carrying out an evaluation test of acoustic characteristics of the mobile phone terminal, the peripheral unit for acoustic test comprising: a dedicated connection port for connecting the terminal acoustic evaluation unit; a first general purpose connection port for connecting the mobile phone terminal; a second general purpose connection port for connecting an external device; and a format converter for converting a transmission signal format between the dedicated connection port and the first general purpose connection port.

According to a second aspect of the present invention, there is provided a peripheral unit for acoustic test for connecting a mobile phone terminal with a terminal acoustic evaluation unit that carries out an evaluation test of acoustic characteristics of the mobile phone terminal, the peripheral unit for acoustic test comprising: a dedicated connection port for connecting the terminal acoustic evaluation unit; a first general purpose connection port for connecting the mobile phone terminal; a second general purpose connection port for connecting an external device; and a format converter for converting a transmission signal format between the dedicated connection port and the first general purpose connection port.

DETAILED DESCRIPTION OF THE PREFERRED EMBODIMENTS

The invention will now be described with reference to the accompanying drawings.

Embodiment 1

Figure 1:
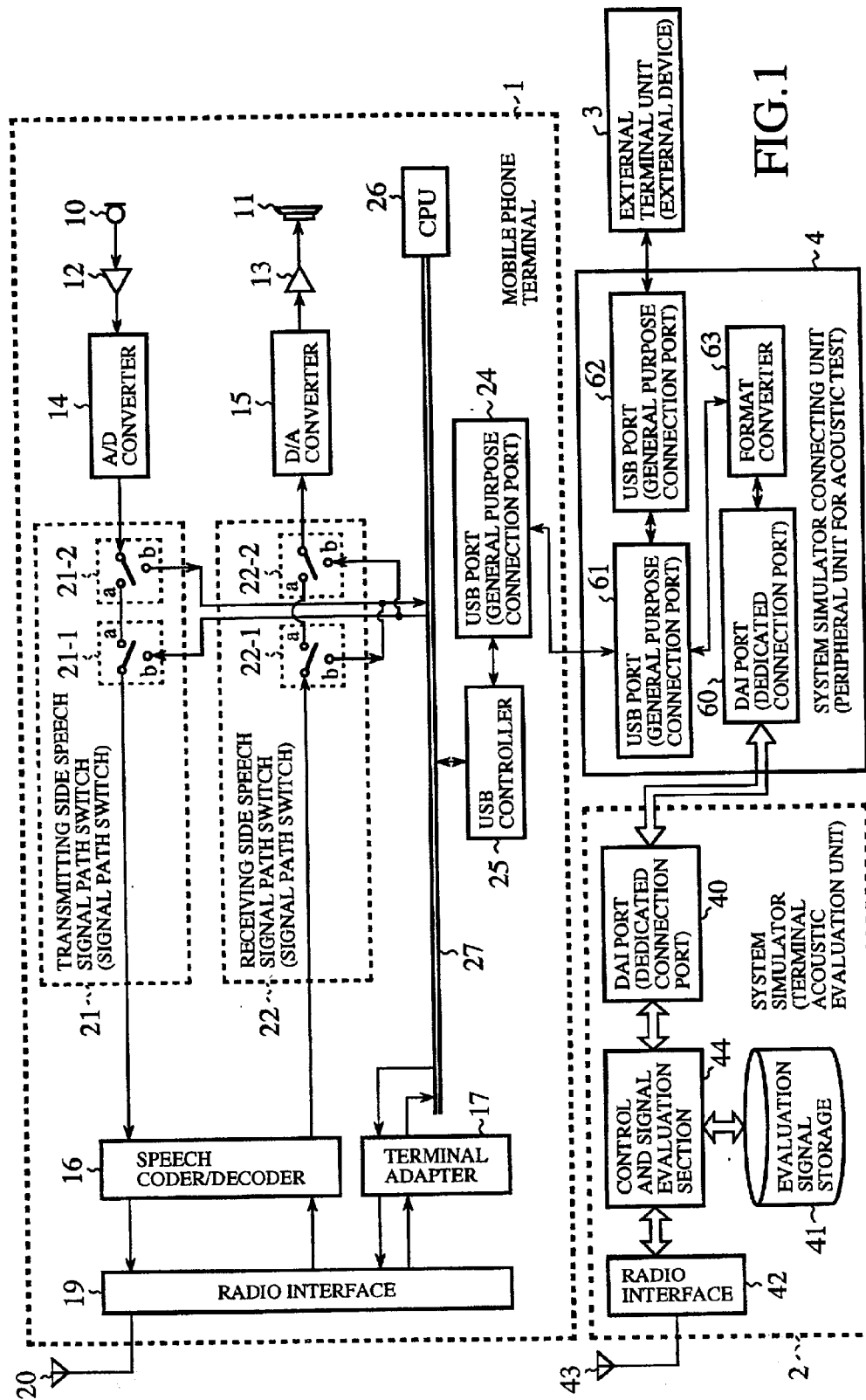
FIG. 1 is a block diagram showing a device connection state in a terminal acoustic evaluation test using a mobile phone terminal and a peripheral unit for acoustic test of an embodiment 1 in accordance with the present invention.

FIG. 1 is a block diagram showing a device connection state in a terminal acoustic evaluation test using a mobile phone terminal and peripheral unit for acoustic test of an embodiment 1 in accordance with the present invention. In this figure, the reference numeral 1 designates a mobile phone terminal; and 2 designates a system simulator as an existing terminal acoustic evaluation unit for conducting the evaluation test of the acoustic characteristics of the mobile phone terminal 1. The reference numeral 3 designates an external terminal unit such as a PC connected to the mobile phone terminal 1; and 4 designates a system simulator connecting unit as a peripheral unit for acoustic test for connecting the system simulator 2 and the external terminal unit 3 to the mobile phone terminal 1.

In the mobile phone terminal 1, the reference numeral 10 designates a microphone for gathering input speech; and 11 designates a receiver for radiating output speech. The reference numeral 12 designates a microphone amplifier for amplifying the input speech fed from the microphone 10; and 13 designates a receiver amplifier for amplifying the output speech to be supplied to the receiver 11. The reference numeral 14 designates an A/D converter for converting the analog electric signal fed from the microphone amplifier 12 to a digital speech signal; and 15 designates a D/A converter for converting the digital speech signal into an analog electric signal to be supplied to the receiver amplifier 13. The reference numeral 16 designates a speech coder/decoder for coding the digital speech signal from the A/D converter 14, and for decoding the digital speech signal to be supplied to the D/A converter 15. The reference numeral 17 designates a terminal adapter for transferring the digital transmission and reception data to be input to or output from the external terminal unit 3. The reference numeral 19 designates a radio interface for controlling the radio communication of the digital transmission and reception data in the speech coder/decoder 16 and terminal adapter 17; and 20 designates an antenna connected to the radio interface 19.

The reference numeral 21 designates a transmitting side speech signal path switch as a signal path switch, which is interposed between the speech coder/decoder 16 and the A/D converter 14, and enables the output of the terminal acoustic evaluation signal through a path different from that in the normal operation mode of the mobile phone terminal 1; the reference numeral 22 designates a receiving side speech signal path switch as a signal path switch, which is interposed between the speech coder/decoder 16 and the D/A converter 15, and enables the input of the terminal acoustic evaluation signal through a path different from that in the normal operation mode of the mobile phone terminal 1.

The reference numeral 24 designates a USB (Universal Serial Bus) port provided in the mobile phone terminal 1 as a general purpose connection port usable for connecting various types of external devices to the mobile phone terminal 1; and 25 designates a USB controller for controlling the USB port 24. The reference numeral 26 designates a CPU having an arithmetic function and control function. The CPU controls the terminal acoustic test signal, and the input and output of the control signal of the transmitting side speech signal path switch 21 and that of the receiving side speech signal path switch 22, between the transmitting side speech signal path switch 21 and receiving side speech signal path switch 22 and the USB port 24. The reference numeral 27 designates a data bus operating under the control of the CPU 26, and having an input and output function of the data sequence of the transmitting side speech signal path switch 21, receiving side speech signal path switch 22, and terminal adapter 17.

In the system simulator 2, the reference numeral 40 designates a DAI port as a dedicated connection port for connecting the system simulator 2 to the mobile phone terminal 1 to carry out the acoustic evaluation test thereof; and 41 designates an evaluation signal storage for storing evaluation signals or evaluation code sequences for the acoustic evaluation test of the mobile phone terminal 1. Reference numerals 42 and 43 designate a radio interface and an antenna for establishing a radio connection with the mobile phone terminal 1 side, and for transferring a setting control signal and an evaluation code sequence between it and the mobile phone terminal 1 side. They have the same functions as the radio interface 19 and antenna 20 of the mobile phone terminal 1 side. The reference numeral 44 designates a control and signal evaluation section that transmits the evaluation signal or evaluation code sequence stored in the evaluation signal storage 41 to the DAI port 40 or radio interface 42, that transfers the evaluation signal or evaluation code sequence supplied from the DAI port 40 or radio interface 42 to the evaluation signal storage 41, and that sends to the DAI port 40 the setting control signals required for the individual test conditions in the mobile phone terminal 1 side.

In the system simulator connecting unit 4, the reference numeral 60 designates a DAI port as a dedicated connection port for establishing a connection with the system simulator 2. The reference numeral 61 designates a USB port as a general purpose connection port for establishing a connection with the mobile phone terminal 1; 62 designates a USB port as a general purpose connection port for establishing a connection with the external terminal unit 3; and 63 designates a format converter for transforming the format of a signal transferred between the DAI port 60 and the USB port 61.

Next, the operation will be described.

First, operations of the individual components shown in FIG. 1 will be described. Among the components of the mobile phone terminal 1, the microphone 10 gathers the voice of a talker using the mobile phone terminal 1, or the input speech for the acoustic evaluation test, and converts it into an analog electric signal to be supplied to the microphone amplifier 12. The microphone amplifier 12 amplifies the analog electric signal supplied from the microphone 10 at a predetermined gain, and supplies its output to the A/D converter 14. The A/D converter 14 converts the analog electric signal amplified by the microphone amplifier 12 into the 13-bit linear PCM digital speech signal at 8000 samples per second specified by the GSM standards, and supplies its output to the transmitting side speech signal path switch 21.

On the other hand, the D/A converter 15 converts the 13-bit linear PCM digital speech signal at 8000 samples per second supplied from the receiving side speech signal path switch 22 into an analog electric signal, and supplies its output to the receiver amplifier 13. The receiver amplifier 13 amplifies the analog electric signal supplied from the D/A converter 15 at a predetermined gain, and supplies its output to the receiver 11. The receiver 11 converts the analog electric signal amplified by the receiver amplifier 13 into voice to be radiated to an external space.

The speech coder/decoder 16 encodes the 13-bit linear PCM digital speech signal at 8000 samples per second fed from the transmitting side speech signal path switch 21 according to a coding method based on a predetermined speech coding scheme, and transfers the code sequence to the radio interface 19. Reversely, it decodes the code sequence fed from the radio interface 19 according to a decoding method based on the predetermined speech coding scheme, and supplies its output to the receiving side speech signal path switch 22 in the form of the 13-bit linear PCM digital speech signal at 8000 samples per second. The terminal adapter 17 allows the radio interface 19 to exchange the digital transmission and reception data with the external terminal unit 3 via the data bus 27, the USB controller 25, the USB port 24 and the system simulator connecting unit 4.

The radio interface 19 modulates the code sequence supplied from the speech coder/decoder 16 or terminal adapter 17 by a predetermined modulation method, and transmits it via the antenna 20. Reversely, it demodulates the signal received by the antenna 20 by the predetermined demodulation method, and supplies the resultant code sequence to the speech coder/decoder 16 or terminal adapter 17. Typically, the external terminal unit 3 consists of a PC used for transferring e-mail or for gaining access to a network via a mobile telephone line.

Incidentally, the external terminal unit 3 may consist of a PC that has a USB port and driver software for controlling the USB port, both of which are not shown, and that can be connected to exchange data with another unit with a USB port such as the system simulator connecting unit 4 with the USB port 62 as shown in FIG. 1. In this case, the external terminal unit 3 can send a command to the USB controller 25 and CPU 26 of the mobile phone terminal 1 via the system simulator connecting unit 4, thereby being able to control the transmitting side speech signal path switch 21 and receiving side speech signal path switch 22 in the mobile phone terminal 1.

Among the components in the system simulator 2, the control and signal evaluation section 44 transfers the evaluation signal or evaluation code sequence stored in the evaluation signal storage 41 to the DAI port 40 or radio interface 42. Reversely, it transfers the evaluation signal or evaluation code sequence supplied from the DAI port 40 or radio interface 42 to the evaluation signal storage 41, and supplies the DAI port 40 with the setting control signal on the mobile phone terminal 1 side, which is necessary for the individual conditions of the terminal acoustic test. The radio interface 42 and antenna 43 have the same functions as the radio interface 19 and antenna 20 in the mobile phone terminal 1: It establishes the radio connection with the mobile phone terminal 1 to exchange the setting control signal and evaluation code sequence with the mobile phone terminal 1.

The transmitting side speech signal path switch 21 includes the switching devices 21-1 and 21-2, and the receiving side speech signal path switch 22 includes the switching devices 22-1 and 22-2. These transmitting side speech signal path switch 21 and receiving side speech signal path switch 22 operate as follows.

The ETSI standards specify the following four operations for the mobile phone terminal 1 connected with the system simulator 2: (1) normal operation; (2) evaluation of the speech decoder; (3) evaluation of the speech coder; and (4) evaluation of the microphone, receiver, A/D converter and D/A converter. They are each set by changing the connections of the individual switching devices 21-1, 21-2, 22-1 and 22-2 of the transmitting side speech signal path switch 21 and receiving side speech signal path switch 22. The control information necessary for changing the connections is transferred from the control and signal evaluation section 44 of the system simulator 2 to the transmitting side speech signal path switch 21 and receiving side speech signal path switch 22 via the DAI port 40, system simulator connecting unit 4, USB port 24, USB controller 25 and data bus 27.

The CPU 26 has arithmetic functions and control functions, and controls the data bus 27. Being controlled by the CPU 26, the data bus 27 exchanges data sequences between the terminal adapter 17 and the transmitting side speech signal path switch 21 and receiving side speech signal path switch 22. On the other hand, the USB controller 25 controls the USB port 24, thereby controlling the data transfer between the data bus 27 and the USB port 24.

The USB is a general purpose serial interface, which is proposed recently as an interface standard of PC peripheral devices. It can achieve multiple connections up to 128 ports, and has two transfer rates of high speed (12 Mbits/second) and low speed (1.5 Mbits/second). Although the conventional DAI port 40 can transfer only the 13-bit linear PCM digital speech signal at 8000 samples per second, the USB ports 24, 61 and 62 can transfer not only the 13-bit linear PCM digital speech signal at 8000 samples per second, but also the speech code sequence input to or output from the speech coder/decoder 16, and the data sequence input to or output from the terminal adapter 17.

The format converter 63 of the system simulator connecting unit 4 performs the format conversion of the signal between the USB port 61 and the DAI port 60, thereby enabling the signal transfer between the USB port 24 of the mobile phone terminal land the DAI port 40 of the system simulator 2. Here, the format conversion of the signal between the USB port 61 and DAI port 60 by the format converter 63 refers to the signal conversion including the buffering for absorbing the difference between the transfer rates of the USB port 61 and DAI port 60, and signal conversion in accordance with the connection conditions such as electrical signal conditions, signal timings, logical interfaces between the individual ports.

Figure 10:
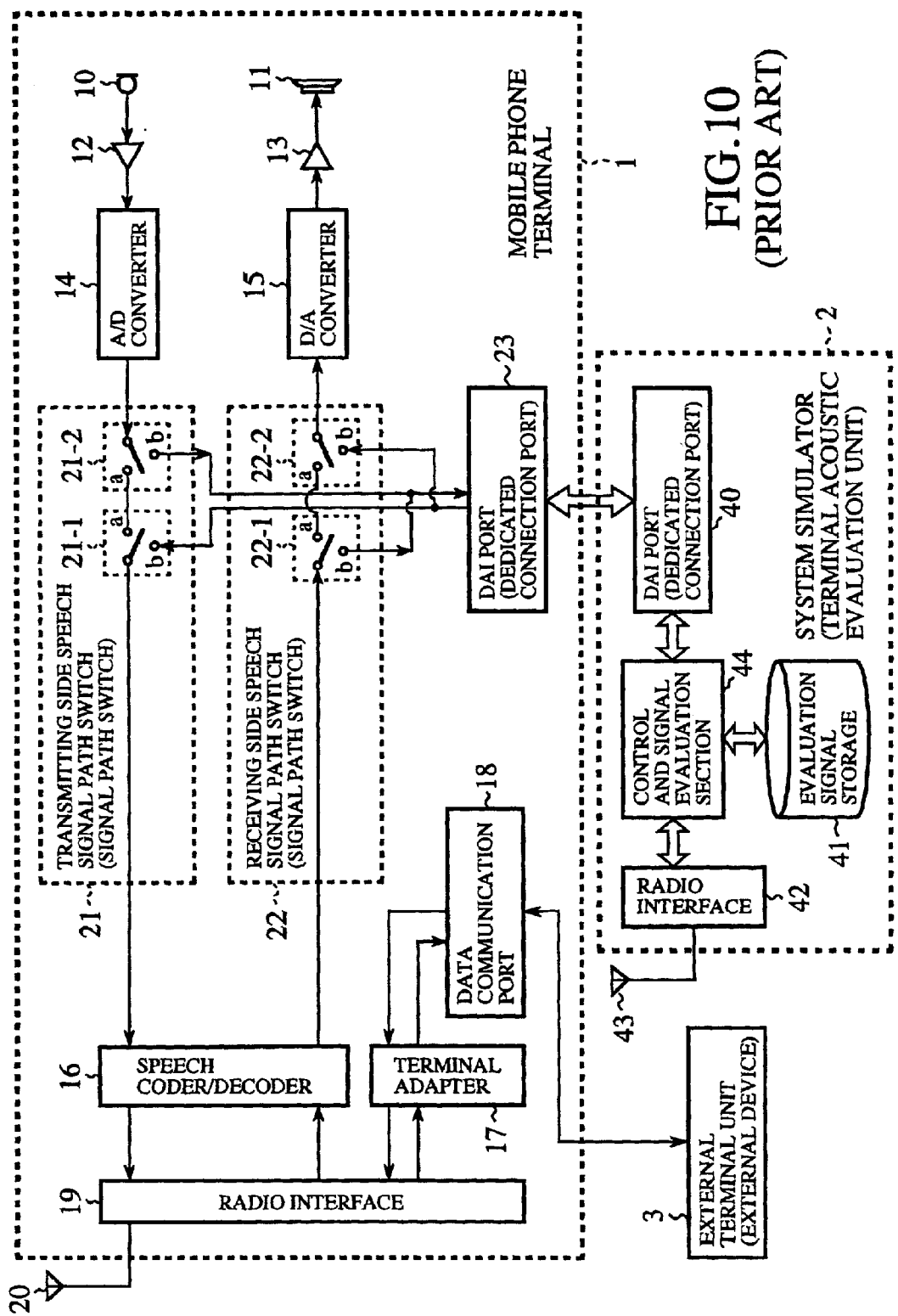
FIG. 10 is a block diagram showing a device connection state in a terminal acoustic evaluation test in a conventional mobile phone terminal.
Figure 11:
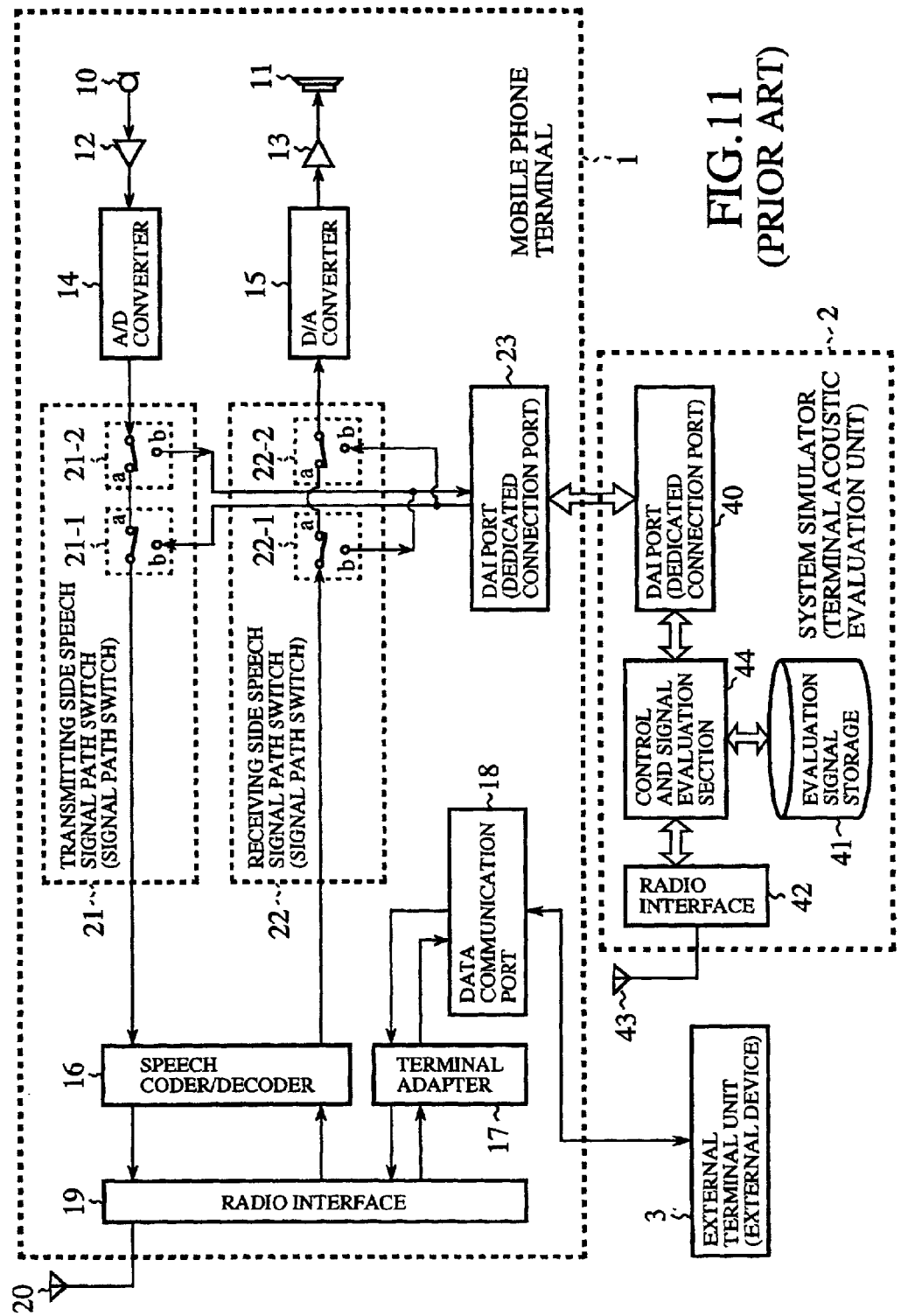
FIG. 11 is a block diagram illustrating a connection state of the signal path switches in the normal operation of the conventional mobile phone terminal.
Figure 12:
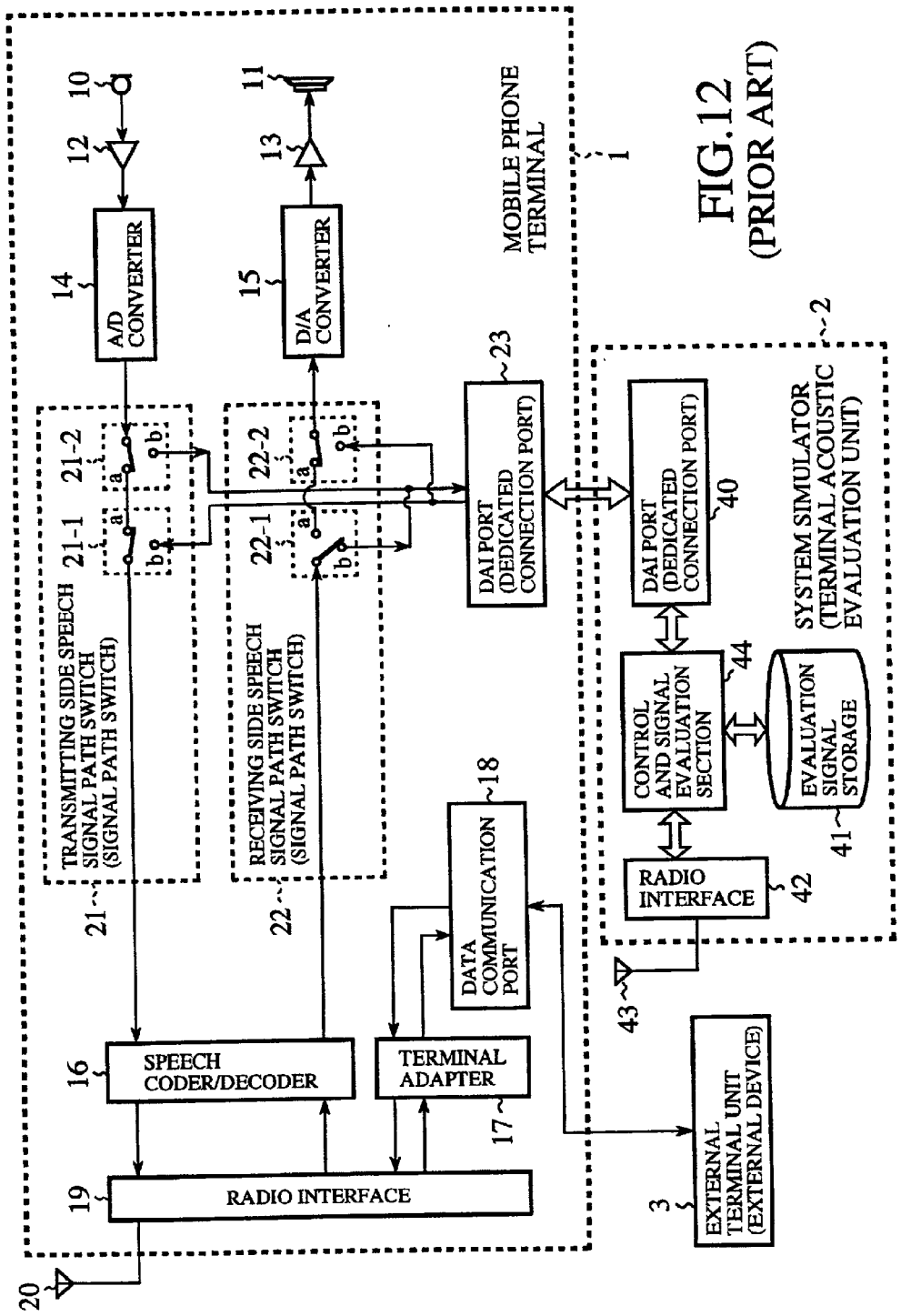
FIG. 12 is a block diagram illustrating a connection state of the signal path switches in the evaluation of the speech decoder of the conventional mobile phone terminal.
Figure 13:
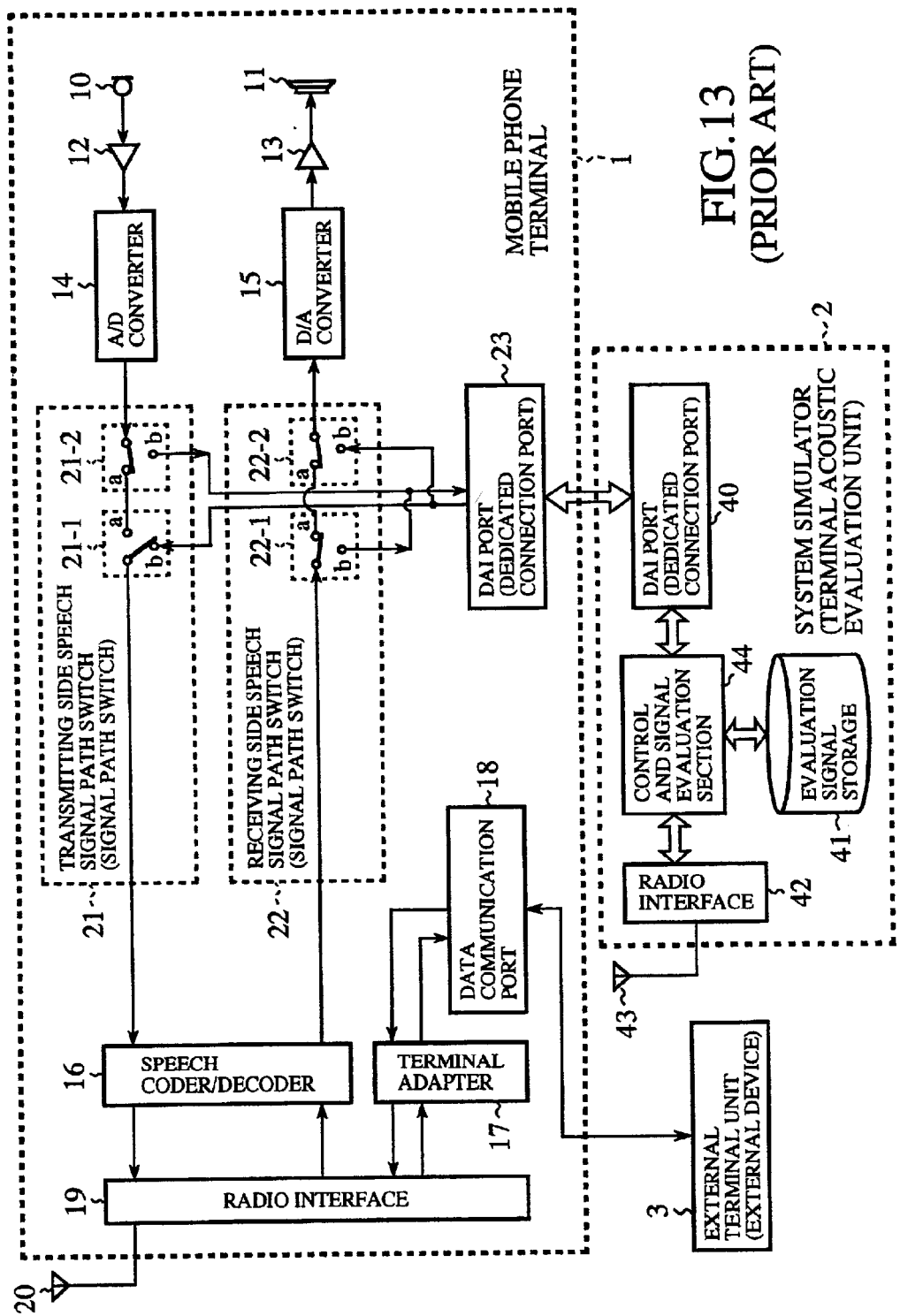
FIG. 13 is a block diagram illustrating a connection state of the signal path switches in the evaluation of the speech coder of the conventional mobile phone terminal.
Figure 14:
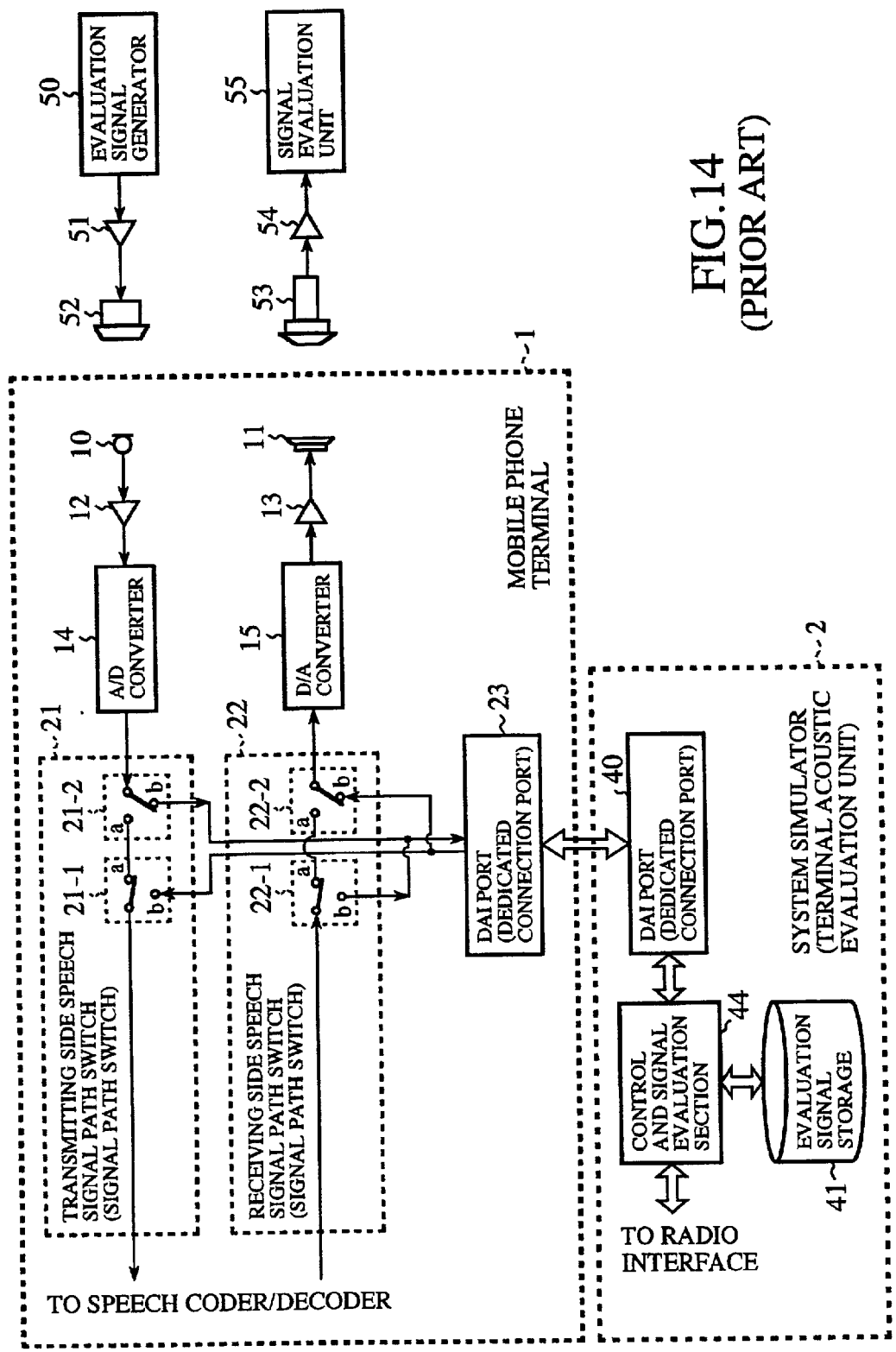
FIG. 14 is a block diagram illustrating a connection state of the signal path switches in the evaluation of the microphone, receiver, A/D converter and D/A converter of the conventional mobile phone terminal.

With such a configuration, the USB port 24, USB controller 25 and data bus 27 enable the data transfer between the terminal adapter 17 and the external terminal unit 3 like a PC without using the data communication port 18 of the conventional mobile phone terminal 1 as shown in FIG. 10. Likewise, as for the connection with the system simulator 2 which requires the DAI port 23 of the mobile phone terminal 1, the USB port 24, USB controller 25 and data bus 27 can also implement the connection. As a result, it is unnecessary for the mobile phone terminal 1 to comprise the DAI port and the data communication port separately.

Figure 2:
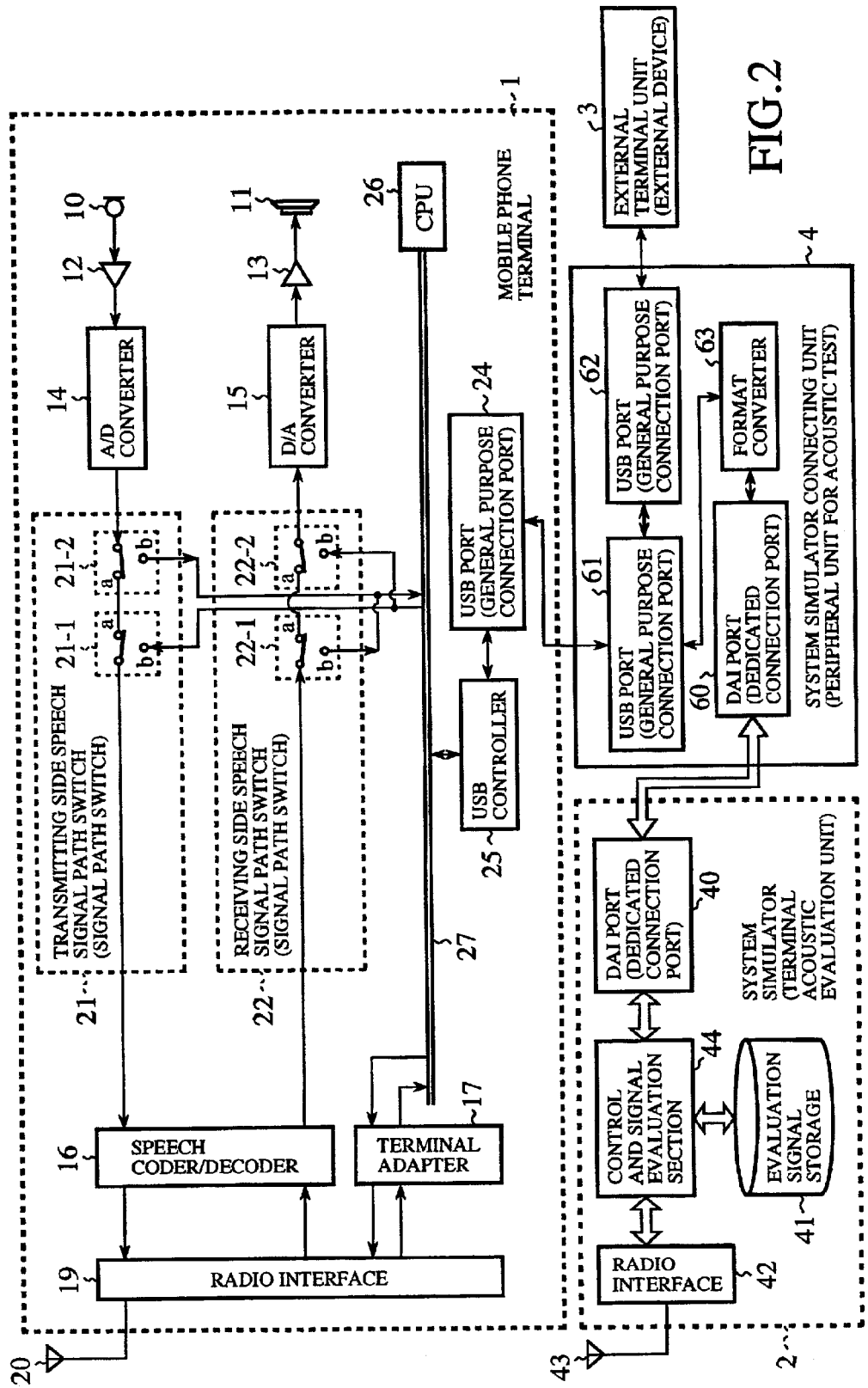
FIG. 2 is a block diagram illustrating a connection state of the signal path switches in the normal operation mode of the mobile phone terminal in the embodiment 1.

FIG. 2 is a block diagram showing a connection state of the transmitting side speech signal path switch 21 and receiving side speech signal path switch 22 in the normal operation mode of the mobile phone terminal 1 of the embodiment 1. The normal operation is implemented by connecting each of the switching devices 21-1 and 21-2 of the transmitting side speech signal path switch 21 and the switching devices 22-1 and 22-2 of the receiving side speech signal path switch 22 to the a-position. Thus, the A/D converter 14 and the D/A converter 15 are connected to the speech coder/decoder 16 via the transmitting side speech signal path switch 21 and the receiving side speech signal path switch 22, respectively. Therefore, no transfer of the 13-bit linear PCM digital speech signal at 8000 samples per second is carried out between the mobile phone terminal 1 and the system simulator 2 via the USB port 24, system simulator connecting unit 4 and DAI port 40.

Figure 3:
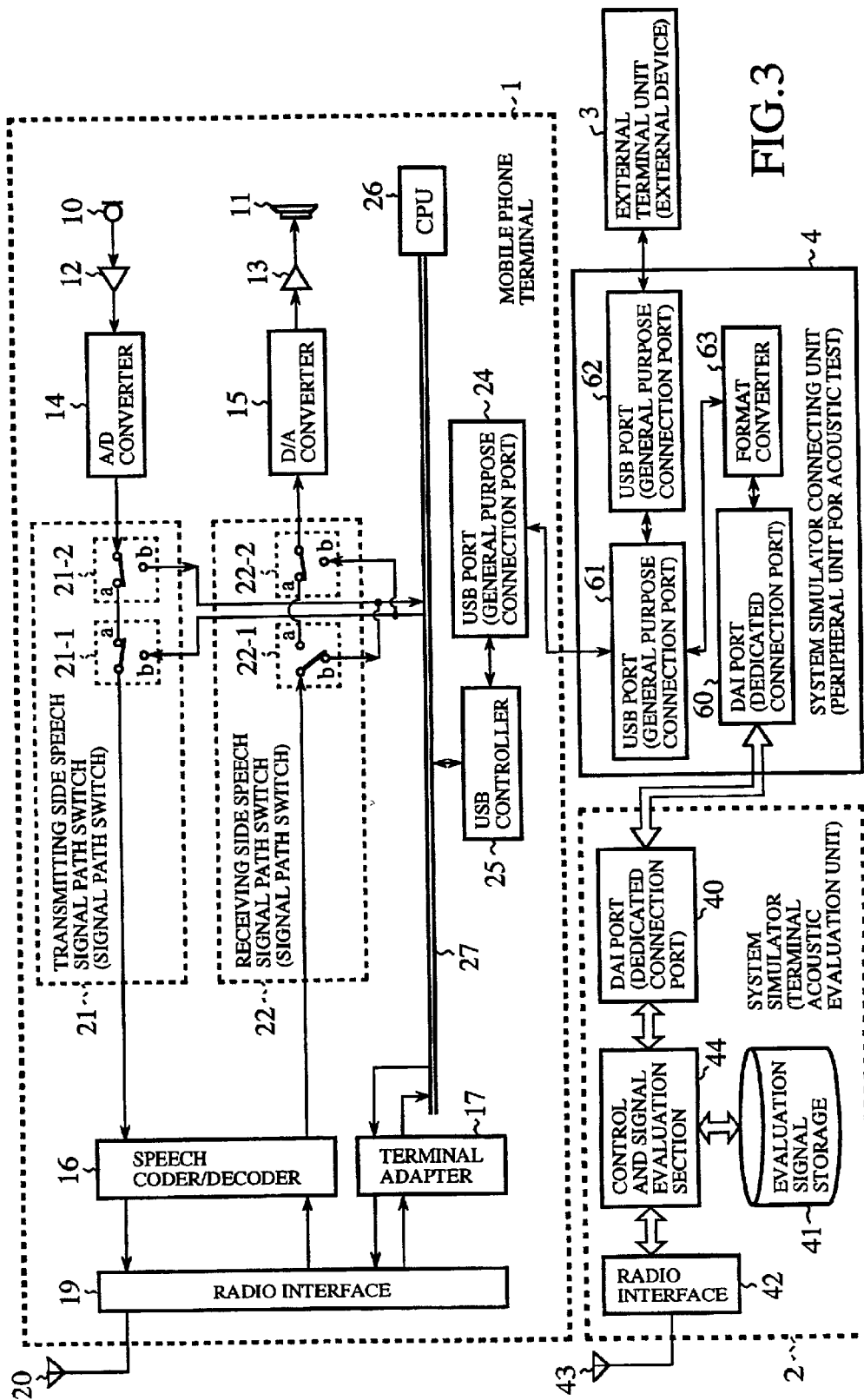
FIG. 3 is a block diagram illustrating a connection state of the signal path switches in the evaluation of the speech decoder of the mobile phone terminal in the embodiment 1.

FIG. 3 is a block diagram showing a connection state of the transmitting side speech signal path switch 21 and receiving side speech signal path switch 22 in the evaluation of the speech decoder of the speech coder/decoder 16. In the evaluation of the speech decoder, the switching devices 21-1 and 21-2 of the transmitting side speech signal path switch 21 are each connected to the a-position, and the switching device 22-1 of the receiving side speech signal path switch 22 is connected to the b-position, and the switching device 22-2 is connected to the a-position.

In this case, the speech code sequence sent from the antenna 43 of the system simulator 2 to the antenna 20 of the mobile phone terminal 1 via the radio connection is decoded by the speech decoder of the speech coder/decoder 16. The 13-bit linear PCM digital speech signal at 8000 samples per second output from the speech coder/decoder 16 passes through the b-position of the switching device 22-1 of the receiving side speech signal path switch 22, the data bus 27, USB controller 25, USB port 24 and system simulator connecting unit 4, and is sent to the system simulator 2 to be captured by its DAI port 40.

In the system simulator 2, the control and signal evaluation section 44 compares bit by bit the 13-bit linear PCM digital speech signal at 8000 samples per second, which is decoded by the speech coder/decoder 16 of the mobile phone terminal 1 and captured by the DAI port 40, with the 13-bit linear PCM digital speech signal at 8000 samples per second, which is prepared in advance as a result of decoding the speech code sequence. If the compared result indicates that they disagree, the control and signal evaluation section 44 makes a decision that the speech coder/decoder 16 of the mobile phone terminal 1 has a problem in the decoding process.

Figure 4:
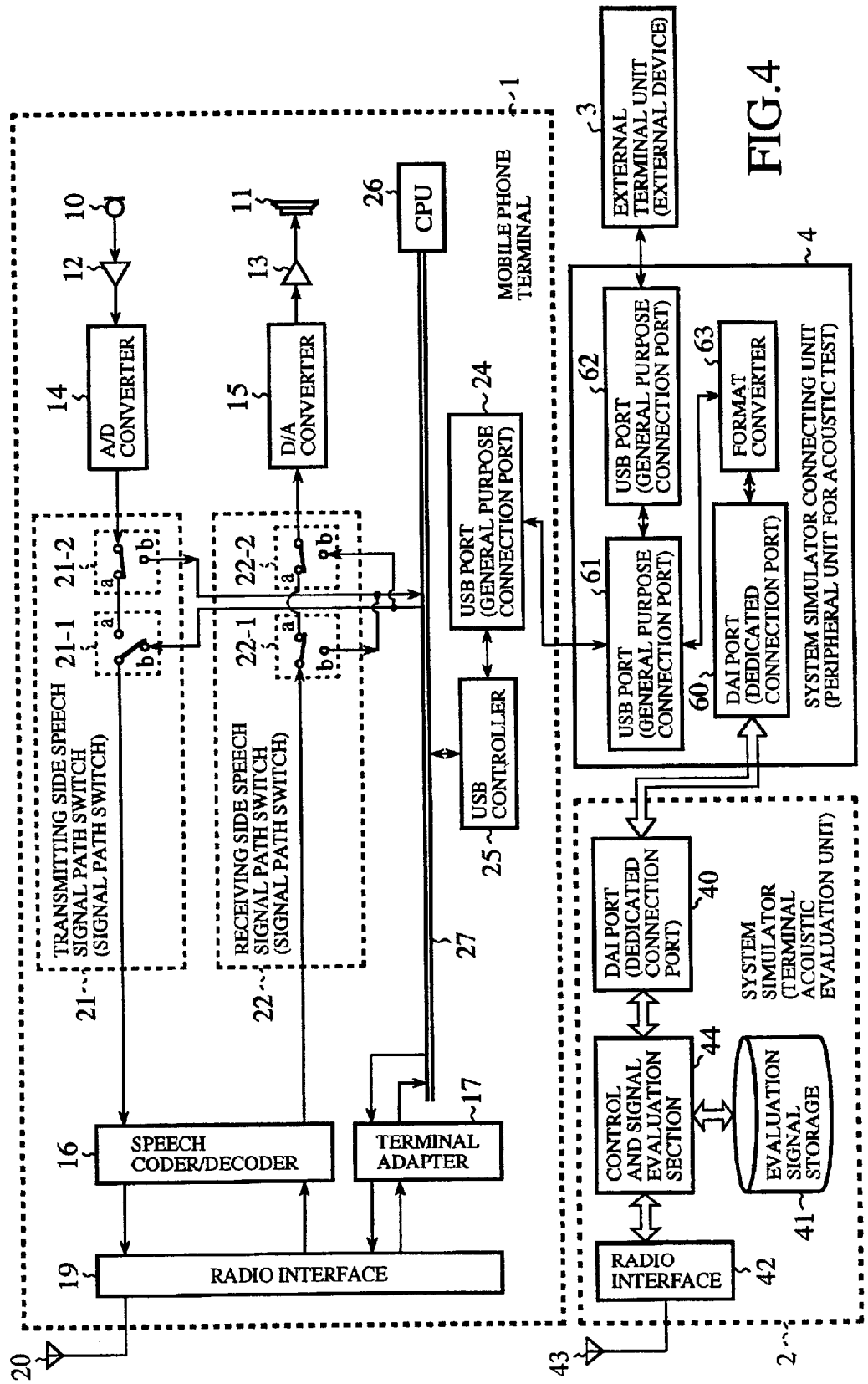
FIG. 4 is a block diagram illustrating a connection state of the signal path switches in the evaluation of the speech coder of the mobile phone terminal in the embodiment 1.

FIG. 4 is a block diagram showing a connection state of the transmitting side speech signal path switch 21 and receiving side speech signal path switch 22 in the evaluation of the speech coder of the speech coder/decoder 16. In the evaluation of the speech coder, the switching device 21-1 of the transmitting side speech signal path switch 21 is connected to the b-position and the switching device 21-2 is connected to the a-position, and the switching devices 22-1 and 22-2 of the receiving side speech signal path switch 22 are each connected to the a-position.

In this case, the 13-bit linear PCM digital speech signal at 8000 samples per second supplied from the DAI port 40 of the system simulator 2 to the mobile phone terminal 1 via the system simulator connecting unit 4 is directly transferred to the speech coder/decoder 16 via the USB port 24, USB controller 25, data bus 27, and the b-position of the switching device 21-1 of the transmitting side speech signal path switch 21 to be encoded by the speech coder. The speech code sequence encoded by the speech coder/decoder 16 is output via the radio interface 19 and antenna 20, and is captured by the antenna 43 via the radio connection, to be supplied to the system simulator 2.

In the system simulator 2, the control and signal evaluation section 44 compares bit by bit the speech code sequence, which is encoded by the speech coder/decoder 16 of the mobile phone terminal 1 and is captured into the system simulator 2 via the radio connection, with the speech encoding result which is prepared in advance as a result of encoding the PCM digital speech signal. If the compared result includes any difference, the control and signal evaluation section 44 makes a decision that the speech coder/decoder 16 of the mobile phone terminal 1 has a problem in its coding process.

Figure 5:
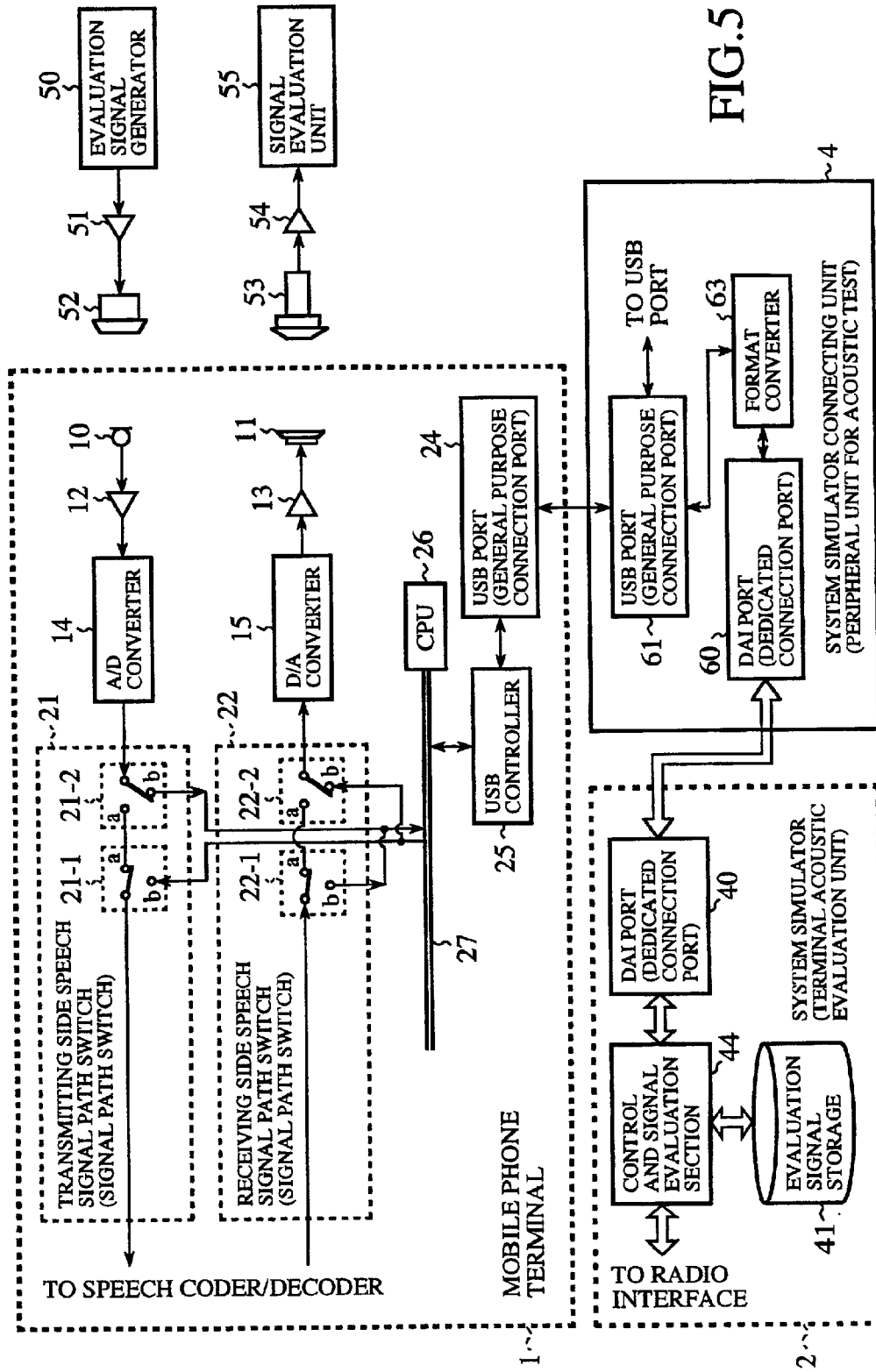
FIG. 5 is a block diagram illustrating a connection state of the signal path switches in the evaluation of the microphone, receiver, A/D converter and D/A converter of the mobile phone terminal in the embodiment 1.

FIG. 5 is a block diagram showing a connection state of the transmitting side speech signal path switch 21 and receiving side speech signal path switch 22 in an evaluation of the microphone, receiver, A/D converter and D/A converter. In FIG. 5, the reference numeral 50 designates an evaluation signal generator for generating an evaluation signal at the evaluation of the microphone 10, receiver 11, A/D converter 14 and D/A converter 15; 51 designates an artificial mouth amplifier for amplifying the evaluation signal; and 52 designates an artificial mouth consisting of a speaker system simulating the acoustic radiation characteristics of a human mouth. The reference numeral 53 designates an artificial ear consisting of a microphone system simulating the acoustic characteristics of a human ear including the external ear, external auditory canal and ear drum; 54 designates an artificial ear amplifier for amplifying the output of the artificial ear; and 55 designates a signal evaluation unit for evaluating the output signal of the artificial ear amplifier. These components are needed for the evaluation of the microphone, receiver, A/D converter and D/A converter.

In FIG. 5, the description is omitted of the speech coder/decoder 16, terminal adapter 17, radio interface 19 and antenna 20 in the mobile phone terminal 1, of the radio interface 42 and antenna 43 in the system simulator 2 and of the external terminal unit 3, because they have nothing to do with the evaluation of the microphone, receiver, A/D converter and D/A converter.

The evaluation of the microphone, receiver, A/D converter and D/A converter is conducted by connecting the switching device 21-1 of the transmitting side speech signal path switch 21 to the a-position, the switching device 21-2 to the b-position, the switching device 22-1 of the receiving side speech signal path switch 22 to the a-position, and the switching device 22-2 to the b-position.

First, the operation and evaluation content at the evaluation of the microphone 10 and A/D converter 14 will be described. The artificial mouth amplifier 51 amplifies the evaluation signal such as white noise or a tone signal generated by the evaluation signal generator 50, and the artificial mouth 52 radiates it as the evaluation speech. The sound pressure level of the radiation is controlled by the gain of the artificial mouth amplifier 51. Here, the radiation sound pressure level at a position 2.5 cm apart from the front of the artificial mouth 52 is set at −4.7 dBPa. Subsequently, the microphone 10 of the mobile phone terminal 1 is fixed at a position 2.5 cm apart from the front of the artificial mouth 52. The evaluation speech signal gathered by the microphone 10 is amplified by the microphone amplifier 12, and is transferred to the A/D converter 14 to be converted to the 13-bit linear PCM digital speech signal at 8000 samples per second. The converted 13-bit linear PCM digital speech signal at 8000 samples per second is transferred to the data bus 27 via the b-position of the switching device 21-2 of the transmitting side speech signal path switch 21, so that the DAI port 40 of the system simulator 2 captures it via the USB controller 25, the USB port 24 and system simulator connecting unit 4.

In the system simulator 2, the signal captured by the DAI port 40 is supplied to the control and signal evaluation section 44. The control and signal evaluation section 44 carries out the evaluation of the frequency characteristic of the 13-bit linear PCM digital speech signal at 8000 samples per second by measuring its level or performing its FFT analysis. In particular, it makes a decision as to the level of the 13-bit linear PCM digital speech signal at 8000 samples per second the system simulator 2 captures, with reference to the sound pressure level of the evaluation speech that is radiated from the artificial mouth 52 and is gathered by the microphone 10. In this case, the level is represented in terms of dBov with respect to the digital full scale. For example, as for the input speech of −4.7 dBPa, the control and signal evaluation section 44 checks that it is converted to −26 dBov, or makes a decision that the frequency characteristic agrees with a mask pattern with a predetermined transmission frequency characteristic.

Next, the operation in the evaluation of the receiver and D/A converter will be described. The DAI port 40 of the system simulator 2 transmits a −26 dBov 13-bit linear PCM digital speech signal at 8000 samples per second which is prepared in advance to the USB port 24 of the mobile phone terminal 1 via the system simulator connecting unit 4. The 13-bit linear PCM digital speech signal at 8000 samples per second is transferred to the D/A converter 15 via the USB controller 25, data bus 27, and the b-position of the switching device 22-2 of the receiving side speech signal path switch 22 in the mobile phone terminal 1. The D/A converter 15 converts it into an analog electric signal, and the receiver amplifier 13 amplifies its output. The receiver 11 converts the analog electric signal to voice, and radiates it into space.

The artificial ear 53 gathers the voice radiated from the receiver 11. The artificial ear amplifier 54 amplifies the output of the artificial ear 53. The signal evaluation unit 55 measures the signal level and converts it into the sound pressure, or makes the frequency characteristic analysis by the FFT analysis or the like. In particular, the signal evaluation unit 55 makes a decision as to the −26 dBov 13-bit linear PCM digital speech signal at 8000 samples per second transferred from the system simulator 2, to what sound pressure level (dBPa) the artificial ear 53 converts it. For example, it makes a decision as to whether it is converted into −4.7 dBPa, or whether the frequency characteristic of the speech signal agrees with the conforming mask pattern of the receiver frequency characteristic.

The evaluation of the acoustic echo of the mobile phone terminal 1 is performed in the same manner as the evaluation of the receiver 11 and D/A converter 15. Specifically, the system simulator 2 transmits the 13-bit linear PCM digital speech signal at 8000 samples per second, and the microphone 10 gathers the voice radiated from the receiver 11. The output signal of the microphone is sent back to the system simulator 2 in the same manner as that of the evaluation of the microphone and A/D converter. The control and signal evaluation section 44 compares the level difference between the signals with a specified value, thereby making the evaluation of the acoustic echo.

The switching states of the individual switching devices 21-1, 21-2, 22-1 and 22-2 of the transmitting side speech signal path switch 21 and receiving side speech signal path switch 22 are shown in the following Table 1. Specifically, (1) in the normal operation, all the switching devices 21-1, 21-2, 22-1 and 22-2 are placed at the a-position; (2) in the evaluation of the speech decoder, only the switching device 22-1 of the receiving side speech signal path switch 22 is placed at the b-position; (3) in the evaluation of the speech coder, only the switching device 21-1 of the transmitting side speech signal path switch 21 is switched to the b-position; and (4) in the evaluation of the microphone, receiver, A/D converter and D/A converter, the switching devices 21-1 and 22-1 of the transmitting side speech signal path switch 21 and receiving side speech signal path switch 22 are placed at the a-position, and the switching devices 21-2 and 22-2 are switched to the b-position.

TABLE 1

| Operation state of mobile phone terminal | Switching device of signal path switches | | | |
| --- | --- | --- | --- | --- |
| | 21-1 | 21-2 | 22-1 | 22-2 |
| (1) Normal operation | a | a | a | a |
| (2) Evaluation of speech decoder | a | a | b | a |
| (3) Evaluation of speech coder | b | a | a | a |
| (4) Evaluation of microphone, receiver, A/D and D/A converters | a | b | a | b |

As described above, the present embodiment 1 is configured such that it comprises the transmitting side speech signal path switch 21 and receiving side speech signal path switch 22, which are interposed between the speech coder/decoder 16 and the A/D converter 14 and D/A converter 15 to enable the terminal acoustic evaluation signal to be input and output through a path different from that in the normal operation of the mobile phone terminal 1, and comprises the general purpose USB port 24 which enables the connection with the external device 3, and that carries out between the USB port 24 and these signal path switches the input and output of the terminal acoustic test signal and the control signal of the signal path switches. Therefore, it can not only perform the same test as that of the conventional example, but also integrate the data communication port 18 and DAI port 23 as shown in FIG. 10 into the single USB port 24, thereby being able to reduce the multiple connection ports the conventional mobile phone terminal 1 must possess. As a result, the present embodiment offers an advantage of being able to reduce the size and weight of the mobile phone terminal with fulfilling the same functions and using the same system simulator 2 as those of the conventional example.

Embodiment 2

Although the foregoing embodiment 1 employs the USB port as the general purpose connection port, other general purpose connection ports with a wired connection scheme like the USB are also applicable. For example, those identified by standard names such as IEEE1394, RS232C, RS432 and SCSI can also be used. Alternatively, general purpose connection ports using radio connection, which are typified by the Bluetooth standard, are also applicable. Thus, any general purpose port suitable for the system configuration can be employed.

As a result, the present embodiment 2 emancipates itself from the restriction of the conventional mobile phone terminal 1 that it must comprise multiple connection ports and terminals. Thus, it is enough for the present embodiment to have one general purpose connection port, thereby offering an advantage of being able to reduce the size and weight of the mobile phone terminal with utilizing the system simulator 2 as the conventional example.

Embodiment 3

Although the system simulator connecting unit 4 of the foregoing embodiment 1 comprises only one USB port 62 for the external terminal unit 3, it is obvious that multiple USB ports can be provided for connecting the external terminal unit. In this case, multiple USB devices such as multiple PCs, and a microphone, a speaker and an external storage are connectable.

As a result, the present embodiment 3 offers an advantage of being able to utilize various types of devices as compared with the conventional example that connects the external terminal unit 3 directly to the mobile phone terminal 1.

Embodiment 4

Figure 6:
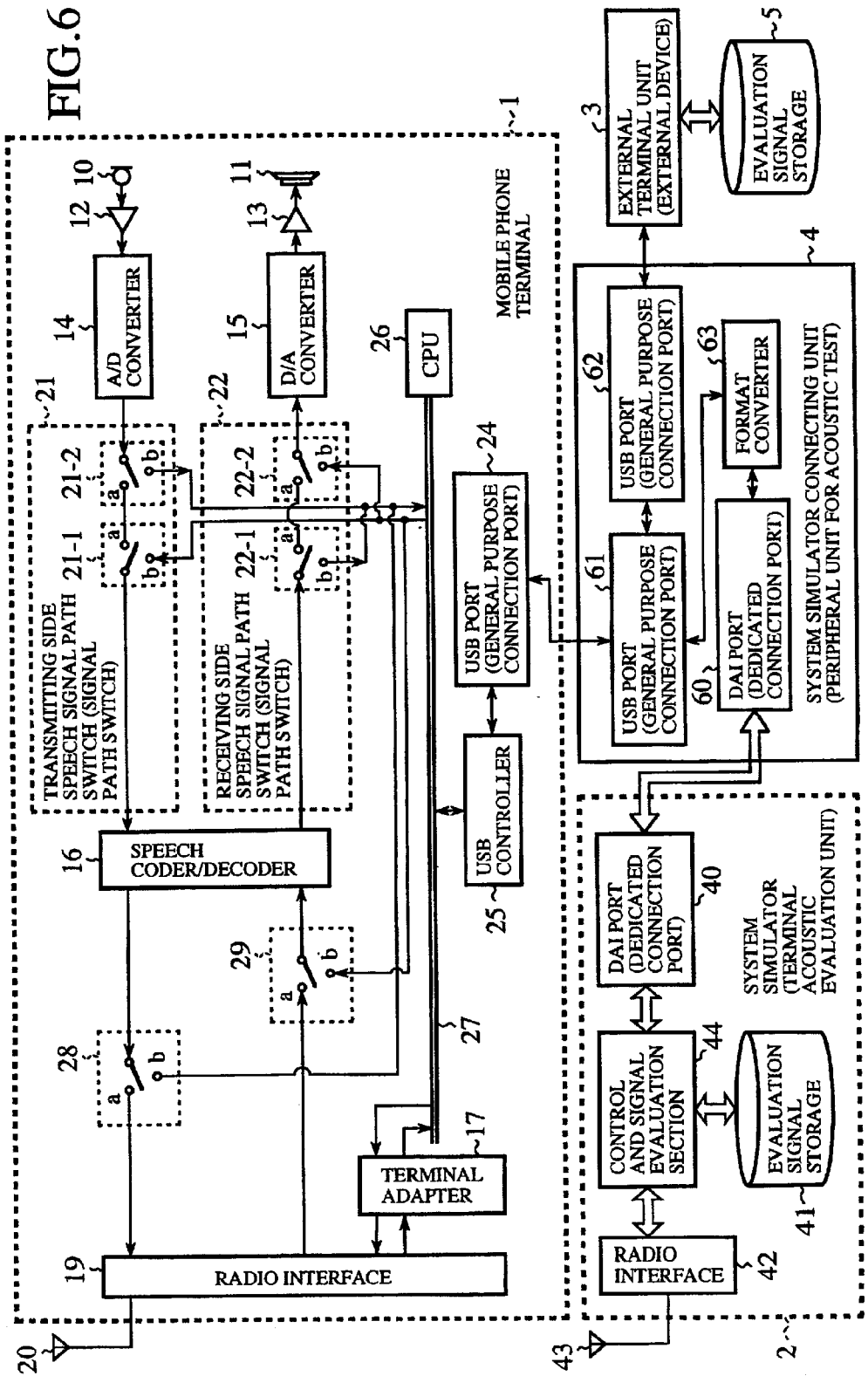
FIG. 6 is a block diagram showing a device connection state in a terminal acoustic evaluation test using the mobile phone terminal and the peripheral unit for acoustic test of an embodiment 4 in accordance with the present invention.

FIG. 6 is a block diagram showing a device connection state in a terminal acoustic evaluation test using the mobile phone terminal and its peripheral unit for acoustic test of an embodiment 4 in accordance with the present invention. In this figure, the reference numeral 1 designates a mobile phone terminal, 10 designates a microphone, 11 designates a receiver, 12 designates a microphone amplifier, 13 designates a receiver amplifier, 14 designates an A/D converter, 15 designates a D/A converter, 16 designates a speech coder/decoder, 17 designates a terminal adapter, 19 designates a radio interface, 20 designates an antenna, 21 designates a transmitting side speech signal path switch, 22 designates a receiving side speech signal path switch, 24 designates a USE port, 25 designates a USB controller, 26 designates a CPU, 27 designates a data bus, 2 designates a system simulator, 40 designates a DAI port, 41 designates an evaluation signal storage, 42 designates a radio interface, 43 designates an antenna, 44 designates a control and signal evaluation section, 3 designates an external terminal unit, 4 designates a system simulator connecting unit, 60 designates a DAI port, 61 and 62 each designates a USB port, and 63 designates a format converter. Since these components are the same as those designated by the same reference numerals in FIG. 1, the description thereof is omitted here.

The reference numeral 28 designates a transmitting side code sequence output switch interposed between the radio interface 19 and the speech coder/decoder 16 in the mobile phone terminal 1 as a signal path switch in order to enable the evaluation code sequence of the speech coder/decoder 16 to be output through a path different from that in the normal operation mode of the mobile phone terminal 1. The reference numeral 29 designates a receiving side code sequence input switch interposed between the radio interface 19 and the speech coder/decoder 16 in the mobile phone terminal 1 in order to enable the evaluation code sequence of the speech coder/decoder 16 to be input through a path different from that in the normal operation mode of the mobile phone terminal 1. The reference numeral 5 designates an evaluation signal storage similar to the evaluation signal storage 41 in the system simulator 2. The evaluation signal storage 5 is connected to the external terminal unit 3 such as a PC for storing the evaluation signals and evaluation code sequences for the acoustic evaluation test of the mobile phone terminal 1. The present embodiment 4differs from the embodiment 1 in that the foregoing individual components are newly added.

Next, the operation will be described.

Since the basic operation is the same as that of the embodiment 1, only the operation of the newly added portions will be described. Although the system simulator 2 can control the transmitting side speech signal path switch 21 or receiving side speech signal path switch 22, it cannot directly control the transmitting side code sequence output switch 28 and receiving side code sequence input switch 29. Thus, the external terminal unit 3 rather than the system simulator 2 carried out the control of the transmitting side code sequence output switch 28 and receiving side code sequence input switch 29.

Here, the external terminal unit 3 is assumed to be a PC that comprises a USB port and driver software for controlling the USB port, both of which are not shown, and enables connection and data transfer with another device having a USB port. In this case, the external terminal unit 3 can control the transmitting side code sequence output switch 28 and receiving side code sequence input switch 29 via the CPU 26 and the USB controller 25 in the mobile phone terminal 1. In addition, the data transfer is also possible between the external terminal unit 3 and the mobile phone terminal 1 via the data bus 27, USB controller 25 and USB port 24. Besides, the external terminal unit 3 can access the evaluation signal storage 5 that stores the same evaluation signals as those stored in the evaluation signal storage 41 of the system simulator 2.

In the normal operation mode, the transmitting side code sequence output switch 28 is connected to its a-position. Accordingly, the output of the speech coder of the speech coder/decoder 16 is supplied to the radio interface 19.

In contrast, when the transmitting side code sequence output switch 28 is connected to the b-position, the output of the speech coder of the speech coder/decoder 16 is supplied to the data bus 27. In this case, when the switching devices 21-1 and 21-2 of the transmitting side speech signal path switch 21 are both connected to the a-position, the coding result of the input speech to the microphone 10 is transferred to the data bus 27. When the switching device 21-1 of the transmitting side speech signal path switch 21 is connected to the b-position, the coding result by the speech coder of the speech coder/decoder 16, which corresponds to the 13-bit linear PCM digital speech signal at 8000 samples per second sent from the system simulator 2, is supplied to the data bus 27.

The receiving side code sequence input switch 29 is also connected to the a-position in the normal operation. As a result, the code sequence from the radio interface 19 is supplied to the speech decoder of the speech coder/decoder 16.

In contrast, when the receiving side code sequence input switch 29 is connected to the b-position, the code sequence from the data bus 27 is supplied to the speech decoder of the speech coder/decoder 16. In this case, when the switching devices 22-1 and 22-2 of the receiving side speech signal path switch 22 are both connected to the a-position, the receiver 11 can monitor the decoding result by the speech decoder of the speech coder/decoder 16, which corresponds to the code sequence transferred via the data bus 27. On the other hand, when the switching device 22-1 of the receiving side speech signal path switch 22 is connected to the b-position, the speech decoder transfers the decoding result, the 13-bit linear PCM digital speech signal at 8000 samples per second, to the data bus 27.

Here, the DAI ports 40 and 60 interconnecting the control and signal evaluation section 44 in the system simulator 2 and the format converter 63 in the system simulator connecting unit 4 can handle only the 13-bit linear PCM digital speech signal at 8000 samples per second. Thus, the following steps are taken.

When the transmitting side code sequence output switch 28 is connected to the b-position, and the switching device 21-1 of the transmitting side speech signal path switch 21 is connected to the b-position, the coding result by the speech coder of the speech coder/decoder 16, which corresponds to the 13-bit linear PCM digital speech signal at 8000 samples per second sent from the system simulator 2 for the evaluation, is transferred to the data bus 27. The speech code sequence as the coding result is transferred from the data bus 27 to the external terminal unit 3 through the USB port 24 and system simulator connecting unit 4. The speech code sequence is compared bit by bit with the evaluation speech code sequence that is obtained by performing predetermined speech coding of the 13-bit linear PCM digital speech signal at 8000 samples per second selected from the evaluation signals stored in the evaluation signal storage 5 which has the same contents as that of the system simulator 2 side and is prepared in the external terminal unit 3 side in advance.

When the receiving side code sequence input switch 29 is connected to the b-position, and the switching device 22-1 of the receiving side speech signal path switch 22 is connected to the b-position, the evaluation speech code sequence is transferred from the evaluation signal storage 5 connected to the external terminal unit 3 to the data bus 27 via the system simulator connecting unit 4 and the USB port 24. In this case, the decoding result by the speech decoder of the speech coder/decoder 16, the 13-bit linear PCM digital speech signal at 8000 samples per second, is supplied to the data bus 27. The decoding result is transferred to the format converter 63 via the USB port 24 and USB port 61 to undergo the format conversion. The signal, the format of which is converted, is captured by the control and signal evaluation section 44 of the system simulator 2 via the DAI port 60 and DAI port 40. The signal is compared bit by bit with the 13-bit linear PCM digital speech signal at 8000 samples per second corresponding to the evaluation speech code sequence among the evaluation signals stored in the evaluation signal storage 5 which has the same contents as that of the system simulator 2 side and is prepared in the external terminal unit 3 side in advance.

As a result, among the mobile phone terminal test items in the foregoing Table 1, as for the test items associated with the speech coder and speech decoder, it is possible to evaluate them by capturing the individual coding result or decoding result into the external terminal unit 3 or system simulator 2 directly without passing through the radio interfaces 19 and 42 and antennas 20 and 43.

As described above, the present embodiment 4 is configured such that it comprises the transmitting side code sequence output switch 28 and receiving side code sequence input switch 29 which are interposed between the radio interface 19 and the speech coder/decoder 16, and enable the input and output of the evaluation code sequence of the speech coder/decoder 16 via a path different from that in the normal operation mode of the mobile phone terminal 1, and that carries out, between these switches and the USB port 24, the input and output of the test signal of the speech coder/decoder 16 and the control signal of the transmitting side code sequence output switch 28 and receiving side code sequence input switch 29. Thus, the present embodiment 4 can not only achieve the same tests as those of the conventional example as in the embodiment 1, but also enable the system simulator 2 to capture the coding result and decoding result by the speech coder and speech decoder, which results are free from the characteristics of the radio interfaces 19 and 42 and antennas 20 and 43. Thus, it can achieve the size and weight reduction with using the conventional system simulator 2. In addition, since it performs the evaluation test using a loopback at the transmitting side code sequence output switch 28 and the receiving side code sequence input switch 29, it can obviate the need for the radio connection for the evaluation test. Thus, it is not essential for the mobile phone terminal 1 and the system simulator 2 to have the radio interfaces 19 and 42 and antennas 20 and 43 for the evaluation test. Furthermore, even if the combination with the radio interface 19 is not applicable, the operation test of each component is possible. Thus, the present embodiment 4 offers an advantage of being able to prevent an increase in the error rate because of the radio connection, thereby making it possible to prevent the instability of the evaluation system.

Embodiment 5

Although the foregoing embodiment 4 employs the USB port as the general purpose connection port, other general purpose connection ports with a wired connection scheme like the USB are also applicable as in the foregoing embodiment 2. For example, those identified by standard names such as IEEE1394, RS232C, RS432 and SCSI can also be used. Alternatively, general purpose connection ports using radio connection, which are typified by the Bluetooth standard, are also applicable. Thus, any general purpose port suitable for the system configuration can be employed.

As a result, the present embodiment 5 emancipates itself from the restriction of the conventional mobile phone terminal 1 that it must comprise multiple connection ports and terminals. Thus, it is enough for the present embodiment to have one general purpose connection port, thereby offering an advantage of being able to reduce the size and weight of the mobile phone terminal with utilizing the system simulator 2 the conventional example uses as in the foregoing embodiment 2.

Embodiment 6

Although the system simulator connecting unit 4 of the foregoing embodiment 4 comprises only one USB port 62 for the external terminal unit 3, it is obvious that multiple USB ports can be provided for connecting the external terminal unit. In this case, multiple USB devices such as multiple PCs, and a microphone, a speaker and an external storage are connectable.

As a result, as the foregoing embodiment 3, the present embodiment 6 offers an advantage of being able to utilize various types of devices as compared with the conventional example that connects the external terminal unit 3 directly to the mobile phone terminal 1.

Embodiment 7

Figure 7:
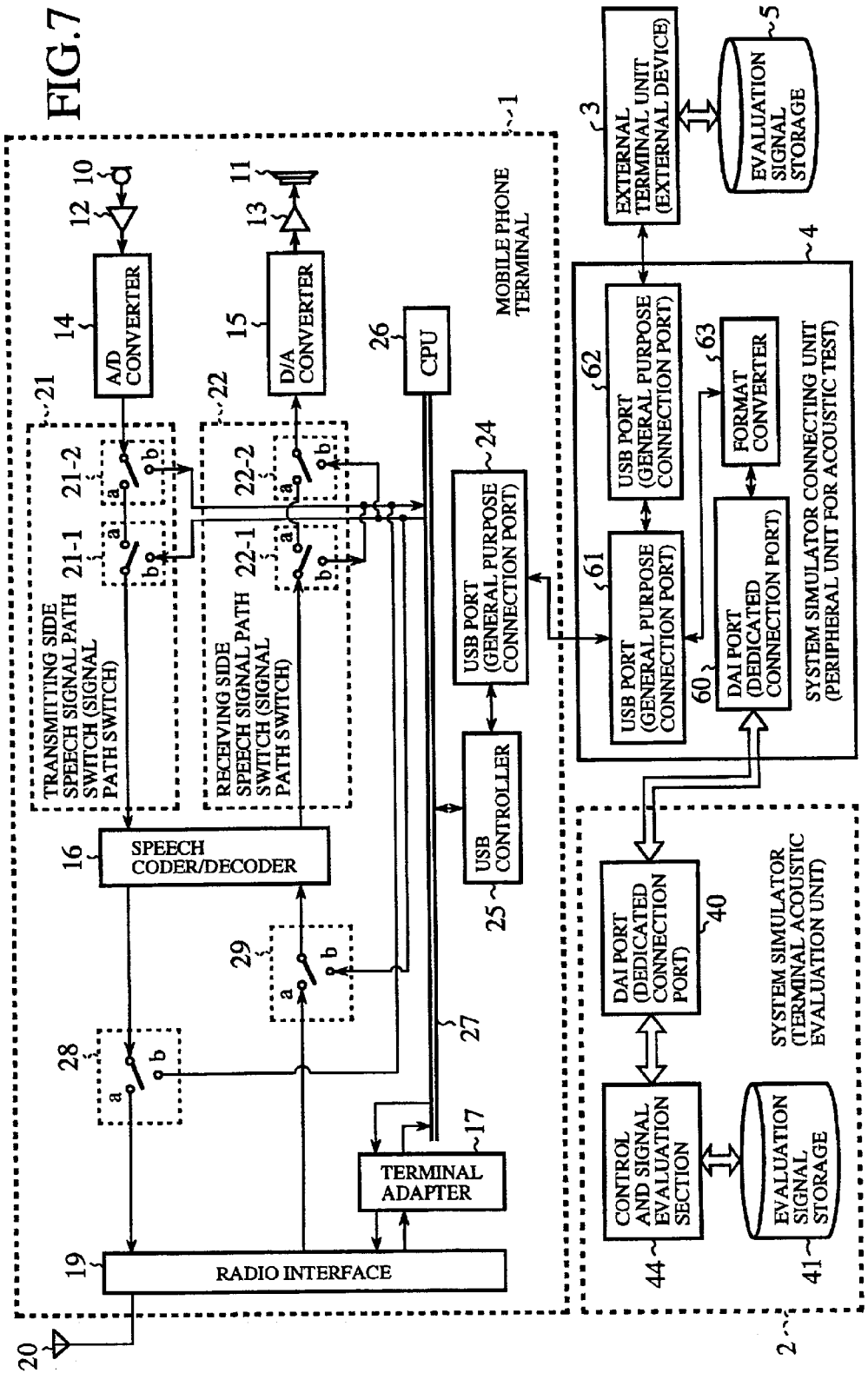
FIG. 7 is a block diagram showing a device connection state in a terminal acoustic evaluation test using the mobile phone terminal and the peripheral unit for acoustic test of an embodiment 7 in accordance with the present invention.

FIG. 7 is a block diagram showing a device connection state in a terminal acoustic evaluation test using the mobile phone terminal and its peripheral unit for acoustic test of an embodiment 7 in accordance with the present invention. The individual components are designated by the same reference numerals as those of FIG. 6, and the description thereof is omitted here. In the present embodiment 7, since the radio interface 42 and antenna 43 of the system simulator 2 are not necessary, they are not shown in FIG. 7. Here, the external terminal unit 3 is assumed to be a PC that comprises a USB port and driver software for controlling the USB port, and enables the connection and data transfer with another device having a USB port as in the embodiment 4.

Although the foregoing embodiment 4 comprises the radio interface 42 and antenna 43 in the system simulator 2, it is possible for the system simulator 2 or external terminal unit 3 in the present embodiment 7 to capture the test signal without using the radio interfaces 19 and 42 and antennas 20 and 43 because the present embodiment 7 employs the transmitting side code sequence output switch 28 and receiving side code sequence input switch 29. As a result, the present embodiment 7 can perform the evaluation equivalent to that of the conventional example without the radio interface 42 and antenna 43.

Thus, according to the present embodiment 7, it is unnecessary for the mobile phone terminal 1 and the system simulator 2 to comprise the radio interfaces 19 and 42 and antennas 20 and 43 to carry out the evaluation equivalent to that of the conventional example. Accordingly, it can not only simplify its configuration, but also perform the operation test of each component. Thus, the present embodiment has an advantage of being able to prevent the instability of the operation of the evaluation system.

Embodiment 8

Figure 8:
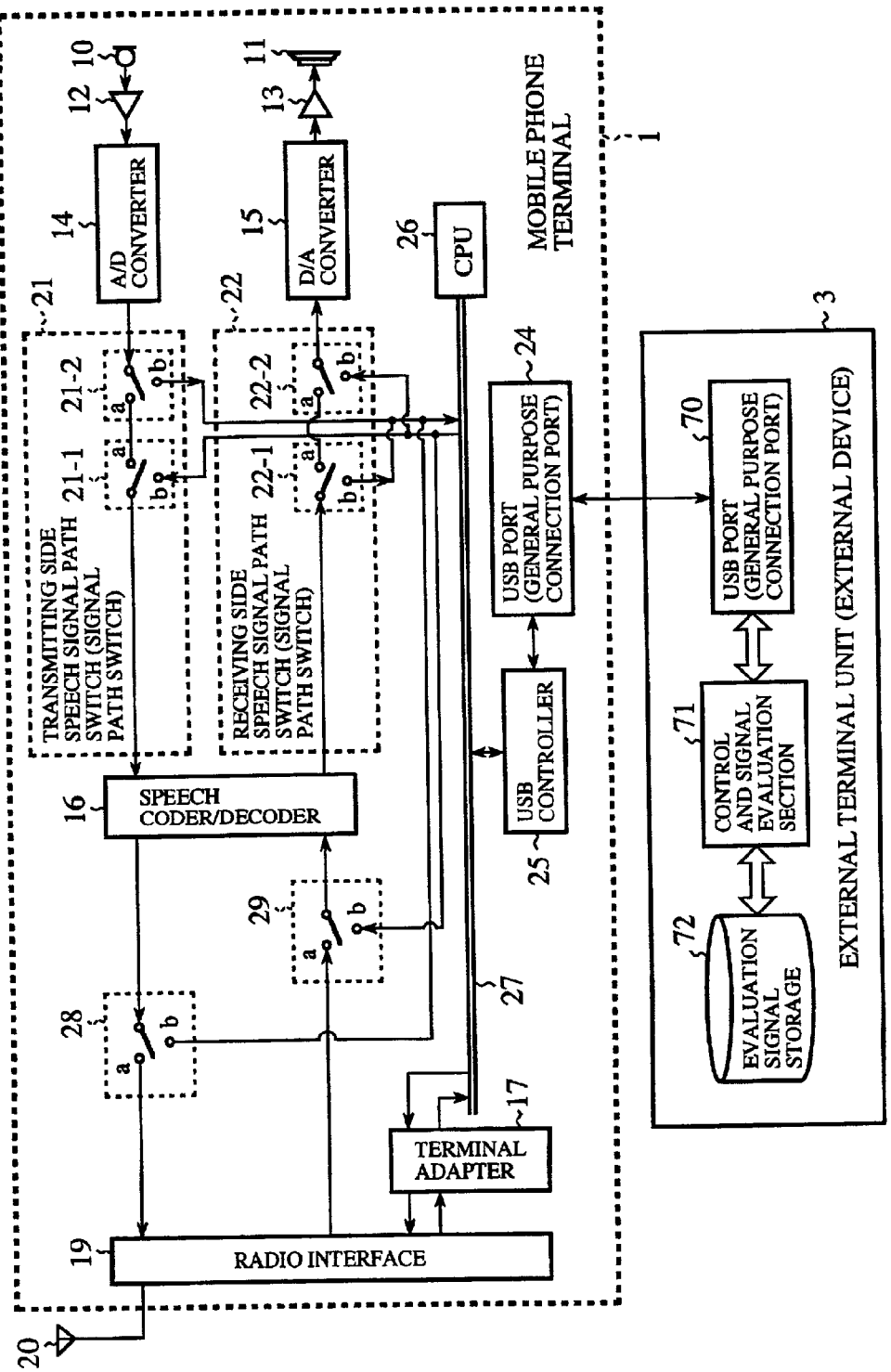
FIG. 8 is a block diagram showing a device connection state in a terminal acoustic evaluation test using the mobile phone terminal and the peripheral unit for acoustic test of an embodiment 8 in accordance with the present invention.

Although the foregoing embodiment 4 handles the case where the external terminal unit 3 is connected to the mobile phone terminal 1 through the system simulator connecting unit 4, the external terminal unit 3 can be connected to the mobile phone terminal 1 directly. FIG. 8 is a block diagram showing a device connection state in a terminal acoustic evaluation test using the mobile phone terminal and its peripheral unit for acoustic test of an embodiment 8 in accordance with the present invention. In FIG. 8, the individual components corresponding to those of FIG. 6 are designated by the same reference numerals, and the description thereof is omitted here.

In this figure, the reference numeral 3 designates an external terminal unit connected to the mobile phone terminal 1. Here, the external terminal unit 3 is assumed to be a PC that comprises a USB port and driver software for controlling the USB port, and enables the connection and data transfer with another device having a USB port as in the embodiment 4. The reference numeral 70 designates a USB port as a general purpose connection port for connecting the external terminal unit 3 directly to the USB port 24 of the mobile phone terminal 1. The reference numeral 71 designates a control and signal evaluation section installed in the external terminal unit 3, a counterpart of the control and signal evaluation section 44 in the system simulator 2 as shown in the embodiment 4; and 72 designates an evaluation signal storage, a counterpart of the evaluation signal storage 41 in the system simulator 2.

Although it is essential for the conventional example to comprise the system simulator 2 because it uses signals input to or output from the system simulator 2 via the radio interfaces 19 and 42 and antennas 20 and 43. In contrast with this, the foregoing embodiments 4–7 enable the system simulator 2 or the external terminal unit 3 to capture the signals by using the transmitting side code sequence output switch 28 and receiving side code sequence input switch 29 instead of using the radio interfaces 19 and 42 and antennas 20 and 43. Thus, the present embodiment 8 is configured such that the external terminal unit 3 comprises a control and signal evaluation section 71 and an evaluation signal storage 72, which correspond to the control and signal evaluation section 44 and evaluation signal storage 41 installed in the conventional system simulator 2, thereby connecting the external terminal unit 3 directly to the mobile phone terminal 1 through the USB connection ports 24 and 70.

As a result, the present embodiment 8 can further simplify the configuration for carrying out the evaluation corresponding to that of the conventional example. In addition, it offers an advantage of being able to perform the operation test of each component, and to prevent the instability of the operation of the evaluation system.

Embodiment 9

Figure 9:
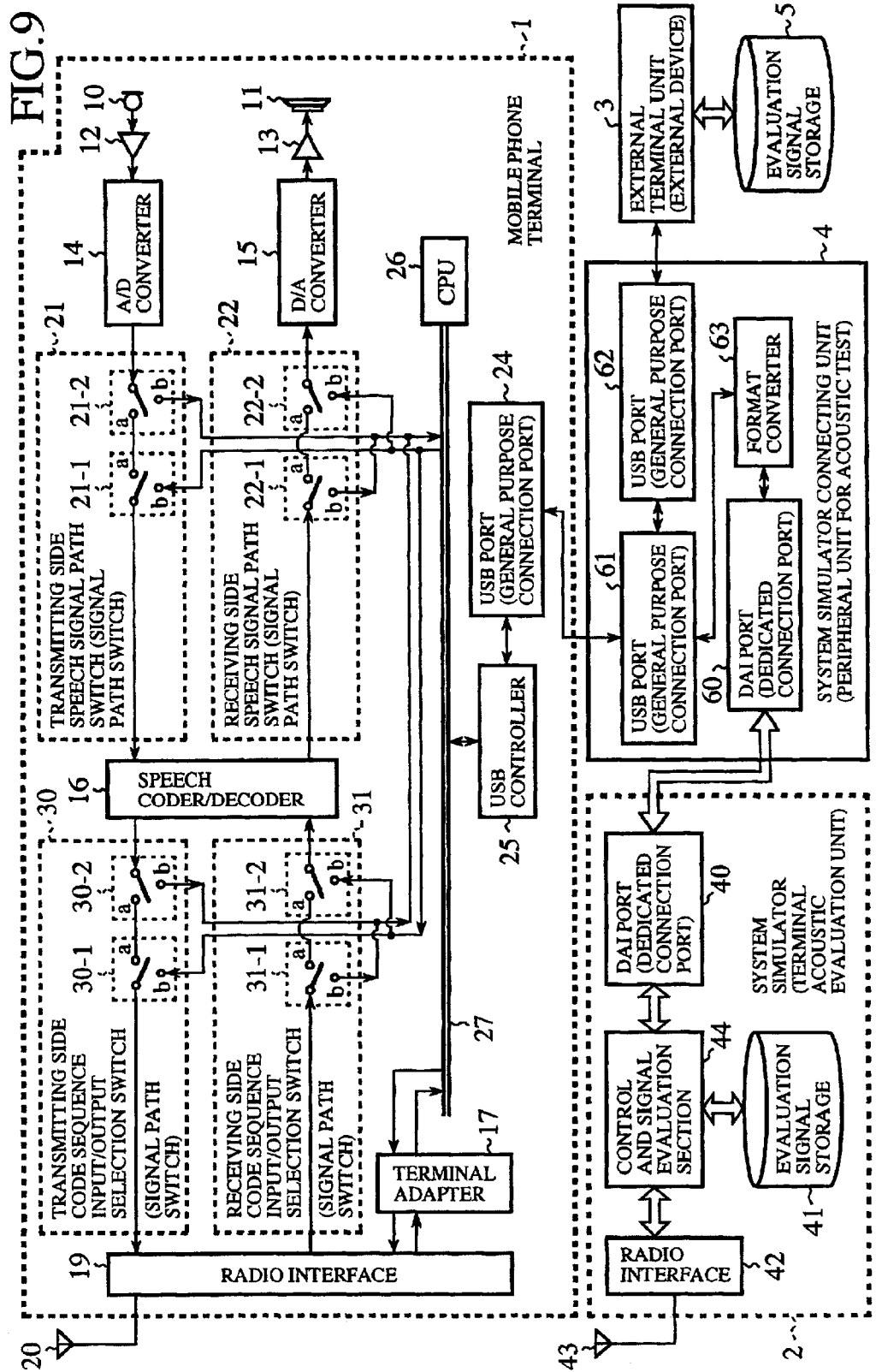
FIG. 9 is a block diagram showing a device connection state in a terminal acoustic evaluation test using the mobile phone terminal and the peripheral unit for acoustic test of an embodiment 9 in accordance with the present invention.

FIG. 9 is a block diagram showing a device connection state in a terminal acoustic evaluation test using the mobile phone terminal and its peripheral unit for acoustic test of an embodiment 9 in accordance with the present invention. The individual components are designated by the same reference numerals as those of FIG. 6, and the description thereof is omitted here. In this figure, the reference numeral 30 designates a transmitting side code sequence input/output selection switch as a signal path switch that is interposed between the radio interface 19 and the speech coder/decoder 16 in the mobile phone terminal 1 to enable the evaluation code sequence of the radio interface 19 to be input and output via a path different from that in the normal operation mode of the mobile phone terminal 1; and reference numerals 30-1 and 30-2 designate switching devices of the transmitting side code sequence input/output selection switch 30. The reference numeral 31 designates a receiving side code sequence input/output selection switch as a signal path switch that is interposed between the radio interface 19 and the speech coder/decoder 16 in the mobile phone terminal 1 to enable the evaluation code sequence of the radio interface 19 to be input and output via a path different from that in the normal operation mode of the mobile phone terminal 1; and reference numerals 31-1 and 31-2 designate switching devices of the receiving side code sequence input/output selection switch 31. Here, the external terminal unit 3 is assumed to be a PC that comprises a USB port and driver software for controlling the USB, and enables the connection and data transfer with another device having a USB port as in the embodiment 4.

Next, the operation will be described.

Since the basic operation is the same as that of the embodiment 4, only the operation of the newly added portions will be described. The transmitting side code sequence input/output selection switch 30 and receiving side code sequence input/output selection switch 31 cannot be activated by the direct control from the system simulator 2 just as the transmitting side code sequence output switch 28 and receiving side code sequence input switch 29 in the embodiment 4 cannot. Thus, they are controlled by the external terminal unit 3. Here, the switching device 30-2 of the transmitting side code sequence input/output selection switch 30 corresponds to the transmitting side code sequence output switch 28 of the embodiment 4, and the switching device 31-2 of the receiving side code sequence input/output selection switch 31 corresponds to the receiving side code sequence input switch 29 of the embodiment 4.

The switching device 30-1 of the transmitting side code sequence input/output selection switch 30 is connected to the to the a-position in the normal operation mode. When the switching device 30-2 is also connected to the a-position at that time, the output of the speech coder of the speech coder/decoder 16 is transferred to the radio interface 19. On the other hand, when the switching device 30-1 is connected to the b-position, the speech coded data from the data bus 27 is transferred to the radio interface 19.

Likewise, the switching device 31-1 of the receiving side code sequence input/output selection switch 31 is connected to the a-position in the normal operation mode. When the switching device 31-2 is also connected to the a-position at that time, the code sequence from the radio interface 19 is supplied to the speech decoder of the speech coder/decoder 16. On the other hand, when the switching device 31-1 is connected to the b-position, the code sequence from the radio interface 19 is supplied to the data bus 27.

As described above, the present embodiment 9 is configured such that it comprises the transmitting side code sequence input/output selection switch 30 and receiving side code sequence input/output selection switch 31 between the radio interface 19 and the speech coder/decoder 16 to enable the evaluation code sequence of the radio interface 19 to be input and output through a path different from that in the normal operation mode, and that it carries out between these switches and the USB port 24 the input and output of the control signal of the transmitting side code sequence input/ output selection switch 30 and receiving side code sequence input/output selection switch 31, and the test signal of the radio interface 19. As a result, the present embodiment 9 can not only achieve the evaluation test equivalent to that of the foregoing embodiments 1 and 4, but also perform the independent evaluation tests of the radio interface 19 and antenna 20. Thus, the present embodiment 9 offers an advantage of being able to perform not only the tests as those of the conventional example, but also the test of the digital signal itself passing through the radio interface 19, thereby enabling the independent characteristic evaluations of the radio interface 19 and antenna 20.

What is claimed is:

1. A mobile phone terminal that converts transmission speech into a digital speech signal by an A/D converter, encodes the digital speech signal by a speech coder/decoder, and transmits the code sequence via a radio interface and an antenna, and that supplies a received signal received by the antenna to the speech coder/decoder via the radio interface, and converts a digital speech signal output from the speech coder/decoder into an analog electric signal by a D/A converter, said mobile phone terminal comprising:

a general purpose connection port usable for connecting an external device to said mobile phone terminal; and a first signal path switch interposed between the speech coder/decoder and the A/D converter and D/A converter to enable a terminal acoustic evaluation signal to be input and output through a path different from that in a normal operation mode of the mobile phone terminal, wherein the terminal acoustic evaluation signal and a control signal of said first signal path switch are input and output through said first signal path switch and said general purpose connection port.

2. The mobile phone terminal according to claim 1, further comprising a second signal path switch interposed between said radio interface and said speech coder/decoder to enable an evaluation code sequence of said speech coder/decoder to be input and output through a path different from that in the normal operation mode of the mobile phone terminal, wherein a test signal of said speech coder/decoder and a control signal of said second signal path switch are input and output through said second signal path switch and said general purpose connection port.

3. The mobile phone terminal according to claim 1, further comprising a second signal path switch interposed between said radio interface and said speech coder/decoder to enable an evaluation code sequence of said radio interface to be input and output through a path different from that in the normal operation mode of the mobile phone terminal, wherein a test signal of said radio interface and a control signal of said second signal path switch are input and output through said second signal path switch and said general purpose connection port.

4. The mobile phone terminal according to claim 1, further comprising a peripheral unit for acoustic test for connecting a mobile phone terminal with a terminal acoustic evaluation unit for carrying out an evaluation test of acoustic characteristics of said mobile phone terminal, said peripheral unit for acoustic test comprising:

a dedicated connection port for connecting said terminal acoustic evaluation unit;

a first general purpose connection port for connecting said mobile phone terminal;

a second general purpose connection port for connecting an external device; and a format converter for converting a transmission signal format between said dedicated connection port and said first general purpose connection port.

5. A peripheral unit for acoustic test for connecting a mobile phone terminal with a terminal acoustic evaluation unit that carries out an evaluation test of acoustic characteristics of said mobile phone terminal, said peripheral unit for acoustic test comprising:

a dedicated connection port configured to communicate with said terminal acoustic evaluation unit using a first signal according to a first communication format;

a first general purpose connection port configured to communicate with said mobile phone terminal using a second signal according to a second communication format;

a second general purpose connection port configured to communicate with an external device using a third signal according to the second communication format; and a format converter configured to convert the first signal according to the first communication format on said dedicated connection port to the second signal according to the second communication format on said first general purpose connection port.

6. The peripheral unit for acoustic test of claim 5, wherein the format converter is further configured to convert the second signal according to the second communication format on the first general purpose connection port to the first signal according to the first communication format on the dedicated connection port.

7. The peripheral unit for acoustic test of claim 5, wherein the first and second communication formats each include a digital communication format.

8. The peripheral unit for acoustic test of claim 5, wherein the first communication format includes a Digital Audio Interface (DAI) format.

9. The peripheral unit for acoustic test of claim 5, wherein the second communication format includes a Universal Serial Bus (USB) format.

10. The peripheral unit for acoustic test of claim 6, wherein the format converter is further configured to absorb a difference of a transfer rate of the dedicated connection port and a transfer rate of the first general purpose connection port.

* * * * *